(12) United States Patent
Musha et al.

(10) Patent No.: US 7,811,709 B2
(45) Date of Patent: Oct. 12, 2010

(54) NEGATIVE ELECTRODE FOR NONAQUEOUS SECONDARY BATTERY, PROCESS OF PRODUCING THE NEGATIVE ELECTRODE, AND NONAQUEOUS SECONDARY BATTERY

(75) Inventors: Shinichi Musha, Ageo (JP); Hitohiko Honda, Ageo (JP); Yoshiki Sakaguschi, Ageo (JP); Kiyotaka Yasuda, Ageo (JP); Akihiro Modeki, Ageo (JP); Tomoyoshi Matsushima, Ageo (JP); Takeo Taguchi, Saitama (JP); Kazuko Taniguchi, Ageo (JP); Makoto Dobashi, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 1212 days.

(21) Appl. No.: 10/529,487

(22) PCT Filed: Nov. 25, 2003

(86) PCT No.: PCT/JP03/15044
§ 371 (c)(1),
(2), (4) Date: Mar. 28, 2005

(87) PCT Pub. No.: WO2004/051768
PCT Pub. Date: Jun. 17, 2004

(65) Prior Publication Data
US 2006/0051675 A1    Mar. 9, 2006

(30) Foreign Application Priority Data

| | | |
|---|---|---|
| Nov. 29, 2002 | (JP) | 2002-348990 |
| Feb. 7, 2003 | (JP) | 2003-031636 |
| Apr. 9, 2003 | (JP) | 2003-105797 |
| Jul. 23, 2003 | (JP) | 2003-278615 |
| Aug. 8, 2003 | (JP) | 2003-290726 |
| Oct. 21, 2003 | (JP) | 2003-360938 |

(51) Int. Cl.
    *H01M 4/64*    (2006.01)
(52) U.S. Cl. .................. 429/233; 429/236; 429/246; 429/232; 429/231.95
(58) Field of Classification Search ............... 429/233, 429/235, 234, 236, 241, 209, 212, 232, 246, 429/218.1, 231.95
See application file for complete search history.

(56) References Cited

U.S. PATENT DOCUMENTS 6,558,841 B1    5/2003  Nakagiri et al.
6,589,690 B1 *  7/2003  Sato et al. .................. 429/162

(Continued)

FOREIGN PATENT DOCUMENTS

CN    1291800    4/2001

(Continued)

OTHER PUBLICATIONS

Xia, Y. et al., "Flake Cu-Sn Alloys as Negative Electrode Materials for Rechargeable Lithium Batteries", *Journal of the Electrochemical Society*, 148 (5) A471-A481 (2001).

*Primary Examiner*—Raymond Alejandro
(74) *Attorney, Agent, or Firm*—Young & Thompson

(57) ABSTRACT

A negative electrode for a non-aqueous electrolyte secondary cell includes a current collector an, formed on a surface or both surfaces thereof, an active material structure containing an electroconductive material with a low capability of forming a compound with lithium, and the active material structure includes 5% to 80% by weight of active material particles containing a material having a high capability for forming a compound with lithium. The active material structure can include an active material layer containing the active material particles and a surface-covering layer on the active material layer.

32 Claims, 3 Drawing Sheets

U.S. PATENT DOCUMENTS

| | | |
|---|---|---|
| 2002/0034687 A1 | 3/2002 | Tamura et al. |
| 2002/0168569 A1* | 11/2002 | Barriere et al. .............. 429/217 |
| 2002/0168572 A1 | 11/2002 | Tamura et al. |

FOREIGN PATENT DOCUMENTS

| | | |
|---|---|---|
| EP | 1 024 544 | 8/2000 |
| EP | 1 054 462 | 11/2000 |
| JP | 4-294059 | 10/1992 |
| JP | 08-050922 | 2/1996 |
| JP | 08-236120 | 9/1996 |
| JP | 10-195689 | 7/1998 |
| JP | 10-312804 | 11/1998 |
| JP | 10-340727 | 12/1998 |
| JP | 11-233116 | 8/1999 |
| JP | 11-250896 | 9/1999 |
| JP | 11-339777 | 12/1999 |
| JP | 2000-012089 | 1/2000 |
| JP | 2000-018499 | 1/2000 |
| JP | 2000-149927 | 5/2000 |
| JP | 2000-149937 | 5/2000 |
| JP | 2000-182671 | 6/2000 |
| JP | 2000-195503 | 7/2000 |
| JP | 2000-251933 | 9/2000 |
| JP | 2000-357515 | 12/2000 |
| JP | 2001-068094 | 3/2001 |
| JP | 2001-68096 | 3/2001 |
| JP | 2001-210315 | 8/2001 |
| JP | 2001-243946 | 9/2001 |
| JP | 2001-250541 | 9/2001 |
| JP | 2001-297757 | 10/2001 |
| JP | 2001-307723 | 11/2001 |
| JP | 2002-110152 | 4/2002 |
| JP | 2002-151065 | 5/2002 |
| JP | 2002-203606 | 7/2002 |
| JP | 2002-260637 | 9/2002 |
| JP | 2002-289178 | 10/2002 |
| KR | 10-0199080 | 6/1999 |
| KR | A-2003-29156 | 4/2003 |
| WO | WO 00/15875 | 3/2000 |

* cited by examiner

Fig.5(a)      Fig.5(b)      Fig.5(c)
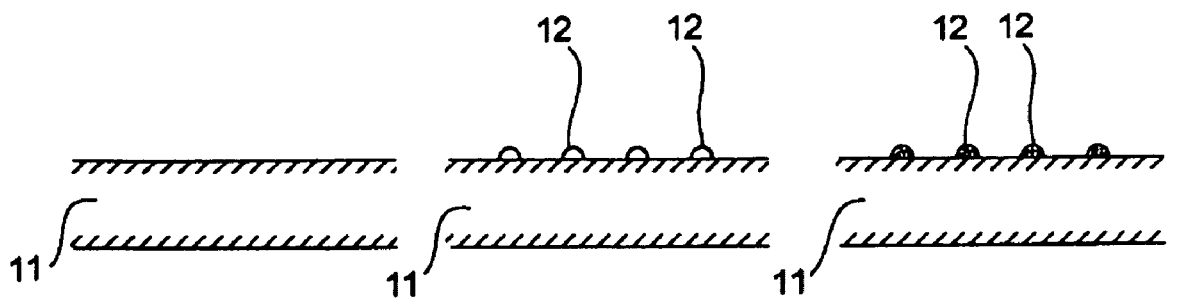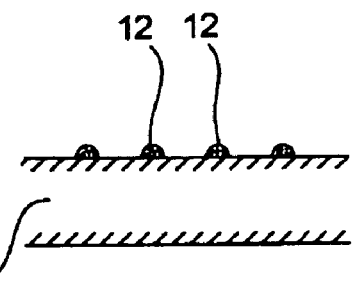
Fig.5(d)      Fig.5(e)      Fig.5(f)
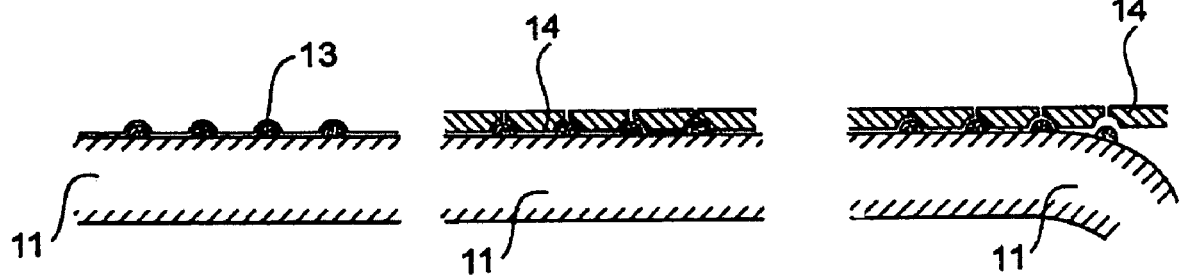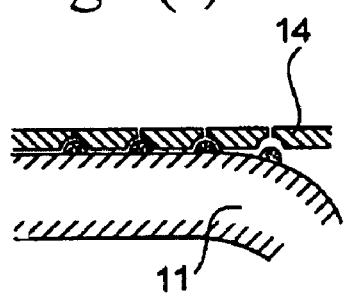

NEGATIVE ELECTRODE FOR NONAQUEOUS SECONDARY BATTERY, PROCESS OF PRODUCING THE NEGATIVE ELECTRODE, AND NONAQUEOUS SECONDARY BATTERY

TECHNICAL FIELD

This invention relates to a negative electrode for nonaqueous electrolyte secondary batteries. More particularly, it relates to a negative electrode capable of intercalating and deintercalating a large amount of lithium and providing a nonaqueous electrolyte secondary battery with high energy density and improved cycle life. The present invention also relates to a nonaqueous electrolyte secondary battery using the negative electrode.

BACKGROUND ART

Secondary batteries now used in mobile phones and notebook computers are mostly lithium ion secondary batteries, due to a higher energy density than other secondary batteries. With the latest tendency of mobile phones and personal computers toward multifunctionality, power consumption of these devices has shown a remarkable increase. Therefore, the demands for higher capacity secondary batteries have been increasing. As long as the present electrode active materials are used, it would be difficult to meet the increasing demands in the near future.

Lithium ion secondary batteries generally use graphite as a negative electrode active material. Now Sn alloys and Si alloys which offer 5 to 10 times the capacity potential of graphite are being actively developed. For instance, it has been proposed to produce Sn—Cu-based alloy flakes by mechanical alloying, roll casting or gas atomization (see J. Electrochem. Soc., 148 (5), A471-A481 (2001)). Production of Ni—Si-based alloys and Co—Si-based alloys by gas atomization etc. is also proposed (see JP-A-2001-297757). While these alloys have high capacity, they have not yet been put to practical use on account of the problems of large irreversible capacity and short cycle life.

There is an attempt to use copper foil, which is used as a current collector, electroplated with tin, as a negative electrode (see JP-A-2001-68094). On the other hand, though silicon has higher capacity potential than tin, there is no report on the development of silicon-containing plated copper foil for use in lithium ion secondary batteries because silicon is an element incapable of electroplating.

The aforesaid Si alloys and Sn alloys and, in addition, Al alloys are negative electrode active materials exhibiting high charge and discharge capacities. However, they have the drawback that they incur large changes in volume with alternate repetition of charging and discharging and, as a result, undergo cracking and pulverizing and finally fall off the current collector. To address this problem, techniques for preparing a negative electrode, of which the active material is prevented from falling off, have been proposed, in which a mixture of a negative electrode active material containing Si or an Si alloy and an electro-conductive metal powder is applied to a conductive metal foil, followed by sintering in a non-oxidative atmosphere (see JP-A-11-339777, JP-A-2000-12089, and JP-A-2002-260637). It has also been proposed to prevent fall-off of a negative electrode active material by forming a thin film of Si on a current collector with good adhesion by plasma-enhanced CVD or sputtering (see JP-A-2000-18499). Moreover, extensive studies have been devoted to development of various Sn or Si-based intermetallic compounds (see JP-A-10-312804, JP-A-2001-243946, and JP-2001-307723). Even with these techniques, however, it is still impossible to perfectly prevent fall-off of the negative electrode active material from the current collector as a result of cracking and pulverizing of the active material, accompanying charge and discharge of a secondary battery.

JP-A-8-50922 proposes a negative electrode having a layer containing a metallic element capable of forming an alloy with lithium and a layer of a metallic element incapable of forming an alloy with lithium. According to the disclosure, this layer structure prevents the layer containing the lithium alloy-forming metal element from cracking and pulverizing accompanying charge and discharge of a battery. Judging from Examples of the publication, however, since the thickness of the layer of the metallic element incapable of forming a lithium alloy, which is the outermost layer, is as extremely small as 50 nm, there is a possibility that the outermost layer fails to sufficiently coat the underlying layer containing the lithium alloy-forming metal element. If so, the layer containing the metallic element capable of forming a lithium alloy cannot be sufficiently prevented from falling off when pulverized with repeated charging and discharging of the battery. Conversely, if the layer of the metal element incapable of forming a lithium alloy completely covers the layer containing the lithium alloy-forming metal element, the former layer would inhibit an electrolyte from passing through the latter layer, which will interfere with sufficient electrode reaction. No proposal has ever been made to satisfy these conflicting functions.

Besides the aforementioned, current collectors with appropriate surface roughness and current collectors having micropores that pierce the thickness are known to be used in lithium ion secondary batteries. For example, JP-A-8-236120 proposes a current collector formed of a porous electrolytic metal foil having pores winding across the thickness and making a three-dimensional network. The porous electrolytic metal foil is produced by a process including the steps of electrodepositing a metal on the surface of a cathode drum to form an electrolytic foil of the metal and separating the foil from the drum, wherein an oxide film having a thickness of at least 14 nm is formed on the surface of the cathode drum exposed after separation of the foil, and electrolytic metal foil is deposited on the oxide film. The porosity and pore size of the metal foil are dependent on the thickness of the oxide film formed on the cathode drum. However, since the oxide film comes off little by little, together with the foil, it is difficult to control the porosity and pore size. Additionally, since the pores have a relatively small diameter and form a three-dimensional network, active material paste applied to one side of the foil and that applied to the other side hardly come into contact with each other. There seems to be a limit, therefore, in improving the adhesion between the paste and the foil.

In order to solve the problems associated with the above-described metal foil, Applicant previously proposed a porous copper foil formed by electrodeposition such that copper grains, having an average planar grain size of 1 to 50 µm, are two-dimensionally bonded to one another. The porous copper foil has an optical transmittance of 0.01% or higher and a surface roughness difference of 5 to 20 µm, in terms of Rz, between the side in contact with a cathode for foil formation and the opposite side (see WO 00/15875). When the copper foil is used as a current collector of a lithium ion secondary battery, the following advantages are offered. (1) Since an electrolyte is able to pass through the copper foil so easily, even a limited amount of an electrolyte is permitted to uniformly penetrate into an active material. (2) The copper foil hardly interferes with donation and acceptance of Li ions and electrons during charge and discharge. (3) Having proper surface roughness, the copper foil exhibits excellent adhesion to an active material. According to the process of making the porous copper foil, however, the electrolytic copper foil deposited on a cathode drum and separated from the drum, is subjected to various processing treatments, which make the copper foil unstable. Therefore, the process cannot be seen as satisfactory in ease of handling the foil and fit for large volume production. Additionally, a nonaqueous secondary battery using a negative electrode, prepared by applying a negative electrode active material mixture to the porous copper foil (a current collector), still has the problem that the negative electrode active material tends to fall off accompanying intercalation and deintercalation of lithium, resulting in reduction of cycle characteristics.

DISCLOSURE OF THE INVENTION

Accordingly, an object of the present invention is to provide a negative electrode for a nonaqueous electrolyte secondary battery that can solve the aforementioned various problems and a nonaqueous electrolyte secondary battery having the negative electrode.

The present invention provides a negative electrode for a nonaqueous electrolyte secondary battery made up of an active material structure including an electro-conductive material having low capability of forming a lithium compound on at least one side of a current collector. The active material structure contains 5 to 80% by weight of active material particles containing a material having high capability of forming a lithium compound.

The present invention also provides a preferred process of producing the negative electrode. The process comprises applying a slurry comprising the active material particles; an electro-conductive carbon material, a binder, and a diluting solvent to a surface of the current collector, drying the coating to form the active material layer, and electroplating the active material layer with the electro-conductive material having low capability of forming a lithium compound to form the surface coating layer.

The present invention also provides another preferred process of producing the negative electrode. The process comprises applying a slurry comprising the active material particles, an electro-conductive carbon material, a binder, and a diluting solvent to a surface of the current collector, drying the coating to form the active material layer, and depositing the electro-conductive material having low capability of forming a lithium compound on the active material layer by sputtering, chemical vapor deposition or physical vapor deposition to form the surface coating layer.

The present invention also provides still another preferred process of producing the negative electrode. The process comprises forming a coat of a material different from the material making up the current collector on a carrier foil to a thickness of 0.001 to 1 μm, electroplating the carrier foil having the coat with the material making up the current collector to form the current collector, applying a slurry comprising the active material particles, an electro-conductive carbon material, a binder, and a diluting solvent to the surface of the current collector, drying the coating to form the active material layer, electroplating the active material layer with the electro-conductive material having low capability of forming a lithium compound to form the surface coating layer, and separating the current collector from the carrier foil.

The present invention also provides a nonaqueous electrolyte secondary battery having the negative electrode.

BRIEF DESCRIPTION OF THE DRAWINGS

FIG. 5($a$), FIG. 5($b$), FIG. 5($c$), FIG. 5($d$), FIG. 5($e$), and FIG. 5($f$) present a flow chart illustrating a process of preparing a porous metal foil used as a current collector in a negative electrode of the present invention.

BEST MODE FOR CARRYING OUT THE INVENTION

Figure 1:
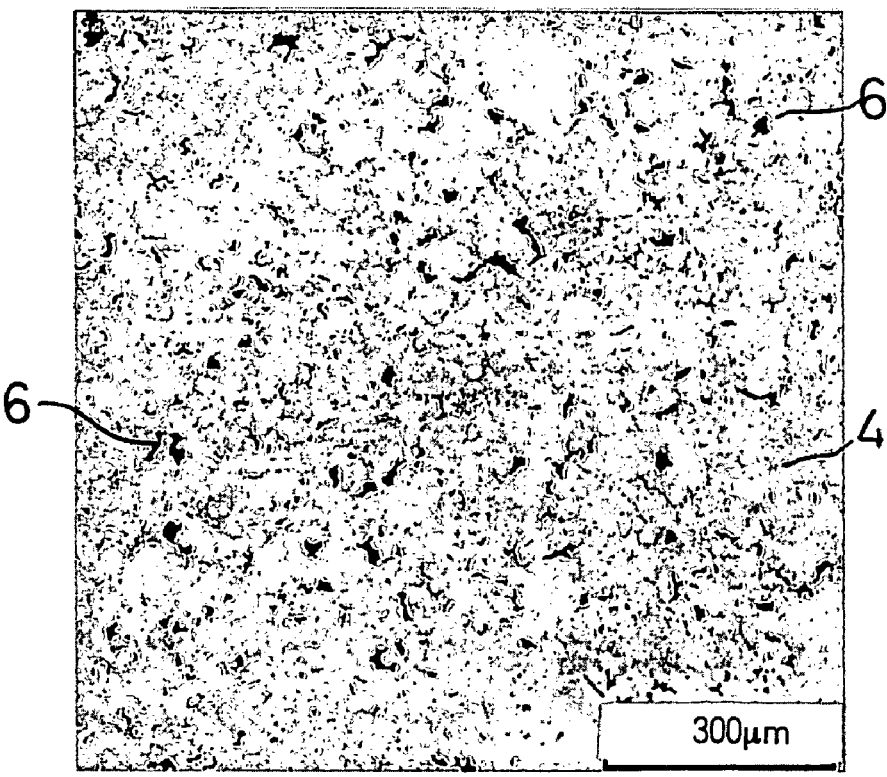
FIG. 1 is an electron micrograph showing the surface of a negative electrode according to the present invention.
Figure 2:
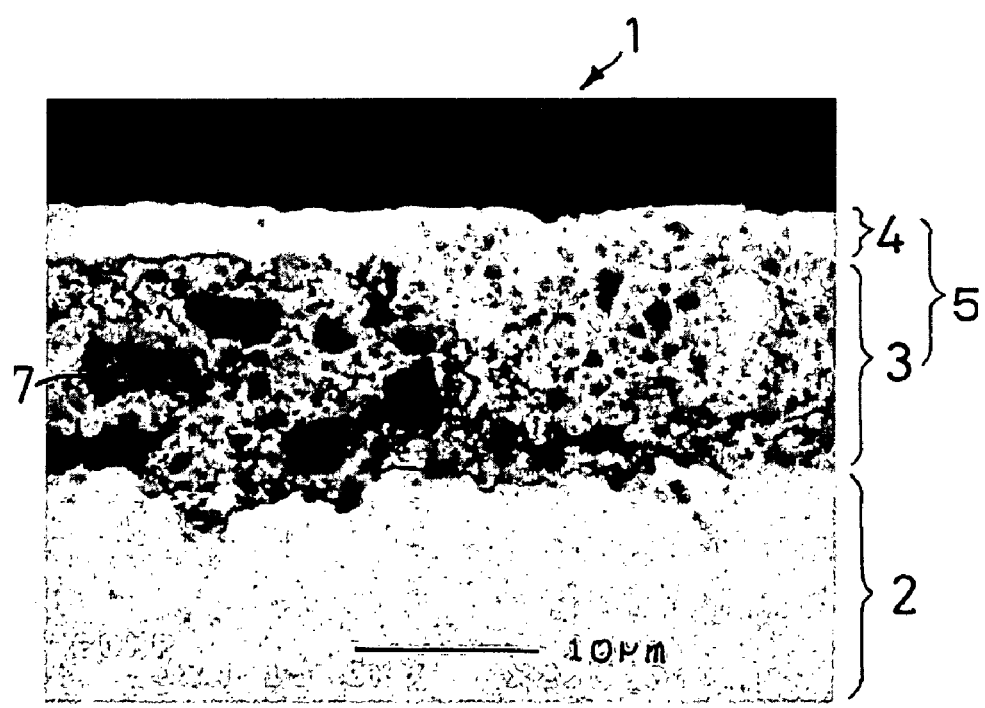
FIG. 2 is an electron micrograph showing a cross-section of a negative electrode according to the present invention.

The present invention will be described based on its preferred embodiments with reference to the accompanying drawings. FIG. 1 is an electron micrograph taken of the surface of a negative electrode according to an embodiment of the present invention. FIG. 2 shows an electron micrograph taken of a cross-section of a negative electrode according to the present invention. The negative electrode 1 has a current collector 2 having formed on one or both sides thereof an active material structure 5 containing an electro-conductive material having low capability of forming a lithium compound. The active material structure comprises active material particles containing a material having high capability of forming a lithium compound. More specifically, the active material structure 5, which is formed on one or both sides of the current collector 2, has a layer 3 of active material particles (hereinafter referred to as an active material layer) and a surface coating layer 4 that is provided on the layer 3 as shown in FIG. 2.

The current collector 2 is made of a metal that can serve as a current collector of a nonaqueous electrolyte secondary battery. It is preferably made of a metal that can serve as a current collector of a lithium secondary battery. Such metals include copper, iron, cobalt, nickel, zinc, and silver, and their alloys. Particularly preferred ones among them are copper, a copper alloy, nickel or a nickel alloy. In using copper, the current collector has the form of copper foil. Copper foil is obtained by, for example, electrodeposition using a copper-containing solution. A preferred copper foil thickness is 2 to 100 μm, still preferably 10 to 30 μm. The copper foil obtained by the method described in JP-A-2000-90937 is particularly preferred because of its extreme thinness with a thickness as small as 12 μm or less. Use of an electrolytic metal foil as a current collector 2 is advantageous in that the adhesion between the current collector 2 and the active material layer 3 is improved because of the moderate surface roughness of an electrolytic metal foil.

The active material layer 3 is a layer containing active material particles 7 which have a material having high capability of forming a lithium compound. Such a material includes silicon materials, tin materials, aluminum materials, and germanium materials. The maximum particle size of the active material particles 7 is preferably 50 μm or smaller, still preferably 20 μm or smaller. The particle size, represented in terms of $D_{50}$ value, of the active material particles 7 is preferably 0.1 to 8 μm, still preferably 0.3 to 1 μm. Where the maximum particle size exceeds 50 μm, the active material particles 7 are liable to fall off, resulting in reduction of electrode life. The lower limit of the particle size is not particularly specified. The smaller, the better. In the light of the process of making the active material particles 7 (described later), the lower limit would be about 0.01 µm. The particle size of the active material particles 7 can be measured by Microtrac, electron microscopic (SEM) observation. While it is desirable that all the active material particles 7 fall under the recited particle size range, it is no problem that greater active material particles 7 are present in a small amount that does not impair the effects of the invention.

It is preferred that voids be present in the active material layer 4. The voids serve to relax the stress which results from expansion and contraction of the active material particles 7 due to intercalation and deintercalation of lithium. In this connection, the proportion of the voids in the active material layer 4 is preferably about 1 to 30% by volume, still preferably about 5 to 30% by volume, particularly preferably about 5 to 9% by volume. The proportion of the voids is obtained through mapping under an electron microscope. The proportion of the voids can be regulated within the recited range by forming the active material layer by the process described later, followed by mechanically pressing the active material layer under appropriate conditions.

The active material layer 4 preferably contains an electro-conductive carbon material in addition to the active material particles 7. Incorporation of the conductive carbon material adds improved electron conductivity to the active material structure 5. From this viewpoint, the amount of the conductive carbon material in the active material layer 3 is preferably 0.1 to 20% by weight, still preferably 1 to 10% by weight. To ensure the improvement on electron conductivity, it is preferred for the electro-conductive carbon material to have the shape of particles with a particle size of 40 µm or smaller, particularly 20 µm or smaller. The lower limit of the particle size is not critical, which means the smaller, the better. In the light of the process of making the particles, the lower limit would be about 0.01 µm. The conductive carbon material includes acetylene black and graphite.

The surface coating layer 4 is a thick layer continuously covering the surface of the active material layer 3, thereby the active material particles 7 are not substantially exposed. The surface coating layer 4 generally covers the surface of the active material layer 3. The surface coating layer 4 has an almost uniform thickness, but some part 4a of the surface coating layer 4 may enter into the active material layer 3. Some part of the surface coating layer 4 penetrating the active material layer 3 may reach the current collector 2. In some parts, the material constituting the surface coating layer 4 may penetrate the whole thickness of the active material layer 3 to reach the current collector. It is preferred that the material constituting the surface coating layer 4 penetrate the active material layer 3 deeper and deeper thereby increasing the electrical conductivity of the negative electrode as a whole. This is also preferred in that the penetrating material constituting the surface coating layer 4 forms a network structure and acts to prevent the active material particles 7 from falling off due to expansion and contraction.

The active material particles 7 do not always need to be covered completely with the surface coating layer 4, and part of them may be exposed. Taking into consideration, however, that the active material particles 7 should be prevented from falling off as a result of pulverization due to intercalation and deintercalation of lithium, it is desirable that the active material particles 7 be completely covered with the surface coating layer 4. Even though the active material particles 7 are completely covered with the surface coating layer 4, an electrolyte and lithium are allowed to penetrate through micropores 6 (described infra) into the inside of the surface coating layer 4 and to react with the active material particles 7.

Figure 3:
FIG. 3 is an electron micrograph showing a cross-section of another negative electrode according to the present invention.
Figure 4:
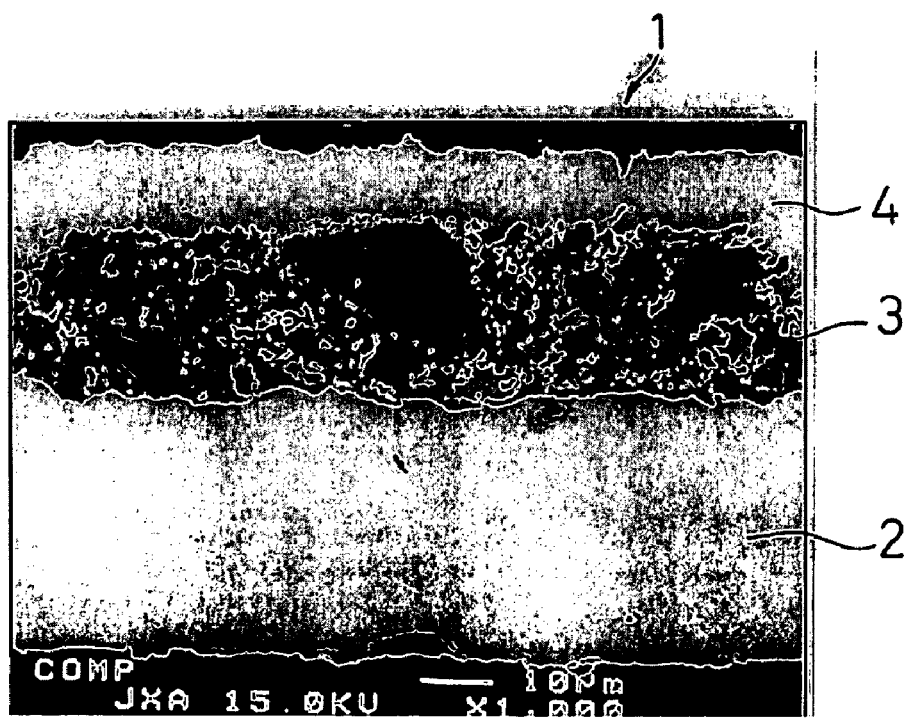
FIG. 4 is an electron micrograph showing a cross-section of still another negative electrode according to the present invention.

FIGS. 3 and 4 represent different examples of the negative electrode in which the active material layer 3 is completely covered with the surface coating layer 4. In FIGS. 3 and 4, the active material layer 3 formed on the current collector 2 that is copper, contains silicon-copper alloy particles, and the surface coating layer 4 that is copper is located on the active material layer 3. The active material layer 3 is completely covered with the surface coating layer 4. In the surface coating layer 4 are observable fine breaks extending in the thickness direction. Voids among alloy particles are observable in the active material layer 3. In FIG. 3, it is seen that part of the surface coating layer 4 goes into the active material layer 3 to such a degree that an alloy particle is surrounded with copper. In FIG. 4, on the other hand, the surface coating layer 4 is not so invasive into the active material layer 3, and the two layers 3 and 4 are defined relatively clearly. Such a difference in layer geometry is ascribed to the process of producing the negative electrode.

The active material layer 3 being covered with the surface coating layer 4, secondary batteries using the negative electrode of the present invention have an extended life compared with conventional ones. Even when the active material particles 7 are pulverized due to intercalation and deintercalation of lithium, they maintain the electrical contact with the surface coating layer 4 since they are shut away by the surface coating layer 4. As a result, the electron conductivity is maintained, and reduction in functions as a negative electrode is suppressed. Furthermore, the service life as a negative electrode can be prolonged. Where, in particular, part of the surface coating layer 4 enters into the active material layer 3, the current collecting function is retained more effectively. If the active material is used as formed on the current collector, it would be pulverized when intercalating and deintercalating lithium and get isolated from the current collector. It would follow that the functions as a negative electrode reduce, and such problems as increase of irreversible capacity, reduction of charge and discharge efficiency, and reduction of life will result.

The surface coating layer 4 is made of an electro-conductive material having low capability of forming a lithium compound so as to be prevented from oxidation and fall-off Such conductive materials include copper, silver, nickel, cobalt, chromium, iron, indium, and alloys of these metals (for example, copper-tin alloys). Of these metals preferred are copper, silver, nickel, chromium, cobalt, and alloys containing these metals because of their particularly low capability of forming a lithium compound. Electro-conductive plastics or electro-conductive pastes are also useful as a, conductive material. The expression "low capability of forming a lithium compound" as used herein means no capability of forming an intermetallic compound or a solid solution with lithium or, if any, the capability is such that the resulting lithium compound contains only a trace amount of lithium or is very labile.

The surface coating layer 4 has on its surface a large number of micropores 6 that extend windingly in the thickness direction thereof Some of the numerous micropores 6 extend in the thickness direction of the surface coating layer 4 to reach the active material layer 3. The micropores 6 are so small as having a width of about 0.1 µm to about 10 µm when observed on a cut section of the surface coating layer 4. Small as they are, the micropores 6 should have such a width as to allow a nonaqueous electrolyte to penetrate. Be that as it may, a nonaqueous electrolyte has a smaller surface tension than an aqueous one so that it is capable of penetrating sufficiently through the micropores 6 with such a small width.

When the surface coating layer 4 is observed from above through an electron microscope, it is desirable for the micropores 6 to have an average opening area of 0.1 to 100 µm², preferably 1 to 30 µm². Within this range of opening area, the surface coating layer 4 effectively prevent the active material layer 3 from falling off while securing sufficient penetration of a nonaqueous electrolyte. For the same reason, it is preferred that the surface coating layer 4, when seen from above, have 1 to 30, still preferably 3 to 10, micropores 6 in every 100 µm-side square in the visual field under an electron microscope. The number of the micropores 6 as defined above is referred to as a distribution. For the same reason, when the surface coating layer 4 is observed from above under an electron microscope, the ratio of the total opening area of the micropores 6 in the visual field to the area of the visual field (i.e., the open area ratio) is preferably 0.1 to 10%, still preferably 1 to 5%.

As can be seen from FIG. 1, the presence of the micropores 6 can be confirmed through electron microscopic observation. In some cases, nevertheless, the micropores 6 are too tiny in their width to observe even under an electron microscope. In such cases, the present invention adapts the following method for confirming micropores 6. A negative electrode to be evaluated is assembled into a battery, and the battery is subjected to one charge/discharge cycle. The cross-section of the negative electrode is then observed with an electron microscope. If any change in cross-sectional structure is observed between before and after the cycle, the negative electrode before the charge/discharge cycle is judged to have had micropores 6. The grounds of this judgement are that the change of the cross-sectional structure, due to the charge/discharge cycle, is a result from the nonaqueous electrolyte's reaching the active material layer 3 through the micropores 6 distributed in the negative electrode before the charge and discharge and causing the lithium ions of the nonaqueous electrolyte to react with the active material particles 7.

The micropores 6 allow a nonaqueous electrolyte to sufficiently penetrate into the active material layer 3 and to sufficiently react with the active material particles 7. Fall-off of the active material particles 7, having pulverized due to charging and discharging, can be prevented by the thick surface coating layer 4 covering the surface of the active material layer 3. That is, since the active material particles 7 are shut up by the surface coating layer 4, fall-off of the active material particles 7 attributed to lithium intercalation and deintercalation can effectively be prevented. Generation of electrically isolated active material particles 7 is effectively prevented and thereby the current collecting performance can be retained. As a result, reduction of functions as a negative electrode is suppressed. Extension of the negative electrode life also results. In particular, where a part 4a of the surface coating layer 4 enters the active material layer 3, the current collecting function is retained more effectively. A secondary battery using the negative electrode of the present invention achieves a remarkably increased energy density per unit volume and unit weight over conventional ones and also enjoys a prolonged life.

The micropores 6 can be formed by various methods. For example, they can be formed by mechanically pressing the surface coating layer 4 under proper conditions. A method of creating the micropores 6 in the surface coating layer 4 simultaneously with the formation of the surface coating layer 4 by electroplating as described later is especially preferred. In more detail, since the active material layer 3 contains the active material particles 7 as previously stated, it has a microscopically textured surface, that is, a mixed profile having active sites where deposit grows easily and sites where deposit does not grow easily. When the active material layer 3 having such a surface condition is electroplated, growth of the deposit differs from site to site, and the particles of the material making up the surface coating layer 4 grow into a polycrystalline structure. On further growth of crystals, adjacent crystals meet, resulting in formation of voids in the meeting site. The thus formed voids connect to each other to form the micropores 6. According to this mechanism, there are formed micropores 6 having an extremely fine structure, and micropores 6 that extend in the thickness direction of the surface coating layer 4 can easily be created. Not involving outer force application, such as pressing force, to the surface coating layer 4, the method is advantageous in that the surface coating layer 4 is not damaged, which means that the negative electrode 1 is not damaged.

In order to effectively prevent fall-off of the active material particles 7 and to sufficiently maintain the current collecting function, it is preferred for the surface coating layer 4 to have a large thickness of 0.3 to 50 µm, still preferably 0.3 to 10 µm, particularly preferably 1 to 10 µm. Even with such a large thickness, penetration of a nonaqueous electrolyte through the surface coating layer 4 is assured by the presence of the micropores 6. For securing sufficient negative electrode capacity, the thickness of the active material layer 3 is preferably 1 to 100 µm, still preferably 3 to 40 µm. The thickness of the active material structure 5 inclusive of the surface coating layer 4 and the active material layer 3 is preferably about 2 to 100 µm, still preferably about 2 to 50 µm. The total thickness of the negative electrode is preferably 2 to 200 µm, still preferably 10 to 100 µm, from the viewpoint of compactness and higher energy density of the battery.

The amount of the active material particles 7 in the active material structure 5 inclusive of the active material layer 3 and the surface coating layer 4 is 5% to 80% by weight, preferably 10% to 50% by weight, still preferably 20% to 50% by weight. It is difficult to sufficiently improve the energy density of the battery with less than 5% by weight of the active material particles 7. More than 80% by weight of the active material particles 7 easily tend to, suffer from fall-off, which can result in increased irreversible capacity, reduced charge and discharge efficiency, and reduced battery life.

The active material particles 7 include (a) particles of single silicon or single tin, (b) mixed particles containing at least silicon or tin and carbon, (c) mixed particles containing silicon or tin and a metal, (d) particles of a compound of silicon or tin and a metal, (e) mixed particles containing particles of a compound of silicon or tin and a metal and metal particles, and (f) single silicon or single tin particles coated with a metal. The particles (a) to (f) can be used either individually or as a combination of two or more kinds thereof Compared with the particles (a), use of the particles (b) to (f) is advantageous in that cracking and pulverizing of the active material particles 7 due to intercalation and deintercalation of lithium is suppressed more. This advantage is particularly conspicuous in using the particles (f). When silicon is chosen, use of the particles (b) to (f) is also advantageous in that poor electron conductivity of silicon, which is semiconductive, can be compensated for.

In particular, where the mixed particles (b) containing at least silicon and carbon are used as active material particles 7, improved cycle life and negative electrode capacity are obtained for the following reason. Carbon, especially graphite, which is used in a negative electrode of nonaqueous secondary batteries, contributes to intercalation and deintercalation of lithium, provides a negative electrode capacity of about 300 mAh/g, and is additionally characterized by its very small volumetric expansion on lithium storage. Silicon, on the other hand, is characterized by as high a negative electrode capacity as about 4200 mAh/g, 10 times or more the negative electrode capacity of graphite. Nevertheless, volumetric expansion of silicon on lithium storage reaches about 4 times that of graphite. Then, silicon and carbon such as graphite are mixed at a predetermined ratio and ground by, for example, mechanical milling to obtain uniformly mixed powder having a particle size of about 0.1 to 1 μm. When this mixed powder is used as an active material, the volumetric expansion of silicon on lithium storage is relaxed by graphite to provide improved cycle life, and a negative electrode capacity ranging about 1000 to 3000 mAh/g is obtained. The amount of silicon in the mixed powder is preferably 10 to 90% by weight. The amount of carbon in the mixed particles is preferably 10 to 90% by weight. Increased battery capacity and extended negative electrode life will be secured with the mixed particles composition falling within the above range. Moreover, no compound such as silicon carbide is formed in the mixed particles.

The mixed particles (b) as active material particles 7 may be a multi-component mixture containing other metal element(s) in addition to silicon or tin and carbon. The other metal element is at least one element selected from the group consisting of Cu, Ag, Li, Ni, Co, Fe, Cr, Zn, B, Al, Ge, In, V, Ti, Y, Zr, Nb, Ta, W, La, Ce, Pr, Pd, and Nd.

In using the mixed particles (c) of silicon or tin and a metal as active material particles 7, the metal in the mixed particles (c) includes at least one of Cu, Ag, Li, Ni, Co, Fe, Cr, Zn, B, Al, Ge, Sn (except for cases where the particles 7 contain tin), Si (except for cases where the particles 7 contain silicon), In, V, Ti, Y, Zr, Nb, Ta, W, La, Ce, Pr, Pd, and Nd. Preferred of these metals are Cu, Ag, Ni, Co, and Ce. It is particularly desirable to use Cu, Ag or Ni for their excellent electron conductivity and low capability of forming a lithium compound. Use of Li as the metal is also preferred. In that case, the active material contains metallic lithium from the beginning, which produces advantages, such as reduction of irreversible capacity, improvement on charge/discharge efficiency, and reduction in volumetric change leading to improved cycle life. In the mixed particles (c), the amount of silicon or tin is preferably 30% to 99.9% by weight, still preferably 50% to 95% by weight, particularly preferably 75% to 95% by weight. The amount of the metal, such as copper, is preferably 0.1% to 70% by weight, still preferably 5% to 50% by weight, particularly preferably 5% to 30% by weight. Increased battery capacity and extended negative electrode life will be secured with the mixed particles composition falling within the above range.

The mixed particles (c) can be prepared, for example, as follows. Silicon particles or tin particles and metal particles, such as copper particles, are mixed and pulverized simultaneously by use of a pulverizer, which includes an attritor, a jet mill, a cyclon mill, a paint shaker, and a fine mill. Pulverization in these pulverizers may be either in a dry system or a wet system. Wet pulverization is preferred for particle size reduction. The particle size before pulverization is preferably about 20 to 500 μm. Mixing and pulverizing in a pulverizer result in formation of uniformly mixed powder of silicon or tin and the metal. The particle size of the resulting powder can be adjusted to, e.g., 40 μm or smaller by properly controlling the operation conditions of the pulverizer. Thus are prepared the mixed particles (c).

Where the active material particles 7 are (d) particles of a compound of silicon or tin and a metal, the compound includes an alloy of silicon or tin and a metal, which is any one of (i) a solid solution of silicon or tin and the metal, (ii) an intermetallic compound of silicon or tin and the metal, and (iii) a composite having at least two phases selected from a single phase of silicon or tin, a single phase of the metal, a solid solution of silicon or tin and the metal, and an intermetallic compound of silicon or tin and the metal. The metal can be selected from those recited above as the metal used in the mixed particles (c). Similarly to the mixed particles (c), the silicon or tin/metal compound particles preferably comprise 30% to 99.9% by weight of silicon or tin and 0.1% to 70% by weight of the metal. A still preferred composition of the compound is selected appropriately according to the process of producing the compound particles. For instance, where the compound is a silicon or tin/metal binary alloy prepared by a quenching process described infra, a preferred amount of silicon or tin is 40% to 90% by weight, and a preferred amount of the metal, e.g., copper, is 10% to 60% by weight.

Where the compound is a ternary or higher order alloy containing silicon or tin and metals, the above-described binary alloy further contains a small amount of an element selected from the group consisting of B, Al, Ni, Co, Fe, Cr, Zn, In, V, Y, Zr, Nb, Ta, W, La, Ce, Pr, Pd, and Nd. Such an additional component produces an additional effect in preventing cracking and pulverizing of the active material particles. To enhance the effect, a preferred amount of the additional component in the silicon or tin/metal alloy is 0.01% to 10% by weight, particularly 0.05% to 1.0% by weight.

Where the compound particles (d) are alloy particles, the alloy particles are preferably prepared by a quenching process hereinafter described. The quenching process is advantageous in that the resulting alloy crystallites have a small size and are uniformly dispersible to provide an active material layer that will be prevented from cracking and pulverizing and maintain electron conductivity. The quenching process starts with preparing a molten metal of raw materials including silicon or tin and a metal, e.g., copper by high frequency melting. The ratio of silicon or tin and the metal in the molten metal is selected from the above-specified range. The molten metal temperature is preferably 1200° to 1500° C., still preferably 1300° to 1450° C., in connection to the quenching conditions. An alloy is made from the molten metal by mold casting. That is, the molten metal is poured into a copper- or iron-made mold and quenched to obtain an alloy ingot, which is ground and sieved to obtain particles, e.g., of 40 μm or smaller for use in the present invention. A roll casting process can be used instead of the mold casting process. In a roll casting process, the molten metal is injected onto the peripheral surface of a roll which is made of copper and rotates at a high speed. For quenching the molten metal, the rotating speed of the roll is preferably 500 to 4000 μm, still preferably 1000 to 2000 rpm. The rotating speed in terms of peripheral speed is preferably 8 to 70 m/sec, particularly preferably 15 to 30 m/sec. When the molten metal having the above-specified temperature is quenched on the roll rotating at the above-specified speed, the cooling rate reaches $10^2$ K/sec or higher, preferably $10^3$ K/sec or higher. The injected molten metal is rapidly cooled on the roll and made into a thin strip, which is ground and sieved to obtain particles having a particle size, e.g., of 40 μm or smaller for use in the present invention. Particles of desired size can also be prepared by a gas atomization process instead of the quenching process. In a gas atomization process, a jet of an inert gas such as argon is applied to the molten metal at 1200° to 1500° C. under a gas pressure of 5 to 100 atm to atomize and quench the molten metal. An arc melting process or mechanical milling can also be used.

Where the active material particles are the mixed particles (e) containing particles of a compound of silicon or tin and a metal and metal particles, the compound particles described with respect to the particles (d) and the metal particles described with respect to the mixed particles (c) can be used in the mixed particles (e). The metal element contained in the compound particles and the metal element of the metal particles may be either the same or different. In particular, when the metal element of the compound particles is nickel, copper, silver or iron, and the metal element of the metal particles is nickel, copper, silver or iron, these metals easily form a network structure in the active material layer 3. Such a metal network structure is effective in improving the electron conductivity and preventing fall-off of the active material particles 7 due to expansion and contraction. Taking these effects into consideration, it is preferred that the metal element in the compound particles and that of the metal particles be the same. The active material particles (e) are obtained by first preparing compound particles in the same manner as for those of the particles (d) and then mixing the compound particles with metal particles in the same manner as for the production of the mixed particles (c). The silicon or tin to metal ratio in the compound particles can be the same as in the compound particles (d). The compound particles to metal particles ratio can be the same as the ratio of silicon or tin particles to metal particles in the mixed particles (c). With respect to other particulars of the active material particles (e), the description given to the mixed particles (c) and the compound particles (d) apply appropriately.

Where the active material particles 7 are (f) the single silicon or single tin particles coated with a metal (hereinafter referred to as "metal-coated particles"), the coating metal is selected from the above-recited metals used in the particles (c) and (d), for example, copper (except Li). The amount of silicon or tin in the metal-coated particles is preferably 70% to 99.9% by weight, still preferably 80% to 99% by weight, particularly preferably 85% to 95% by weight. The amount of the coating metal, such as copper, is preferably 0.1% to 30% by weight, still preferably 1% to 20% by weight, particularly preferably 5% to 15% by weight. The metal-coated particles can be prepared by, for example, electroless plating. In carrying out the electroless plating, a plating bath having silicon particles or tin particles suspended therein and containing a coating metal (e.g., copper) is prepared. The silicon particles or tin particles are electroless plated in the plating bath to deposit the coating metal on the surface of the silicon particles or tin particles. A preferred concentration of the silicon particles or tin particles in the plating bath is about 400 to 600 g/l. In electroless plating using copper as a coating metal, the plating bath preferably contains copper sulfate, Rochelle salt, etc. A preferred concentration of copper sulfate and that of Rochelle salt are 6 to 9 g/l and 70 to 90 g/l, respectively, from the viewpoint of plating rate control. From the same viewpoint, the plating bath preferably has a pH of 12 to 13 and a temperature of 20 to 30° C. The plating bath contains a reducing agent, such as formaldehyde, in a concentration of about 15 to 30 cc/l.

Where the active material particles 7 are silicon-containing particles, it is preferred for the particles to have an average particle size ($D_{50}$) of 0.1 to 10 μm, particularly 0.3 to 8 μm, especially 0.8 to 5 μm, whichever of the forms (a) to (e) the silicon-containing particles may have. In other words, the silicon-containing active material particles are preferably fine particles with a small diameter (hereinafter referred to as "small-diametered active material particles"). Use of such small-diametered active material particles results in reduced fall-off of the active material particles from the negative electrode and makes it feasible to extend the life of the negative electrode. In more detail, active material particles will change greatly in volume upon intercalating and deintercalating lithium and are to be disintegrated into microcrystallites or finer particles in due course of time. It follows that cracks develop, and part of the active material particles lose electrochemical contact among themselves, which causes reduction in charge/discharge cycle characteristics important for a secondary battery. For this reason, fine particles of small size are used in the negative electrode from the very beginning thereby to suppress further size reduction of the particles during charging and discharging and to improve the charge/discharge cycle characteristics. Incidentally, if the small-diametered active material particles have an average particle size smaller than the lower limit of the above-specified range, the particles are susceptible to oxidation. Moreover, such small particles are costly to produce. The particle size of the small-diametered active material particles is measured by a laser diffraction scattering method or under electron microscopic (SEM) observation.

Having a large surface area, small-diametered active material particles are more susceptible to oxidation than relatively large-diametered particles (e.g., those having a diameter of several tens of micrometers). Oxidation of active material particles causes increase of irreversible capacity and reduction of charge/discharge efficiency. Irreversible capacity and charge/discharge current efficiency are important characteristics for secondary batteries similarly to the charge/discharge cycle characteristics. In some detail, if much oxygen is present in small-diametered active material particles, electrochemically intercalated lithium ions form firm bonding with oxygen atoms. It would follow that the lithium ions are not released in discharging. Accordingly, small-diametered active material particles need stricter control of oxygen concentration than relatively large-diametered particles. Specifically, the concentration of oxygen present in the small-diametered active material particles is preferably less than 2.5% by weight, still preferably 1.5% by weight or lower, particularly preferably 1% by weight or lower. In contrast, relatively large-diametered particles, whose surface area is not so large, do not require such severe control against oxidation. It is desirable for the small-diametered active material particles to have as low an oxygen concentration as possible. It is most desirable that no oxygen be present. In the light of the process of producing the small-diametered active material particles, nevertheless, a presently reachable lowest oxygen concentration would be about 0.005% by weight. The oxygen concentration in small-diametered active material particles is measured by gas analysis involving combustion of a sample to be analyzed.

In addition to the preferred oxygen concentration of the whole small-diametered active material particles, it is also preferred that the Si concentration in the outermost surface of the small-diametered active material particles be higher than ½, still preferably not less than ⅘, particularly preferably not less than 10 times, the oxygen concentration in the outermost surface of the particles. As a result of investigations the present inventors have revealed that an increase of irreversible capacity and a decrease of charge/discharge current efficiency are affected predominantly by the oxygen concentration of the outermost surface of the small-diametered active material particles. This is because the oxygen present in the outermost surface easily undergoes reaction with lithium during charging of the secondary battery, which can deteriorate the battery characteristics. Hence, the Si concentration to oxygen concentration ratio in the outermost surface of the particles is specified as described above. The surface oxygen concentration of small-diametered active material particles can be measured with various surface analyzers including an electron spectroscope for chemical analysis (ESCA) and an Auger electron spectroscope (AES).

Whichever of the particles (a) to (e) may be used, the small-diametered active material particles are preferably produced under conditions inhibiting contamination of oxygen, for example, in an inert gas atmosphere.

Whichever of the particles (a) to (e) may be used, the small-diametered active material particles are pulverized to an average particle size within the above-recited range by a prescribed pulverization process, typically exemplified by a dry pulverization process and a wet pulverization process. In dry pulverization, a jet mill is used, for example. In wet pulverization, the particles are dispersed in an organic solvent (grinding liquid), such as hexane or acetone, and ground together with a grinding medium, such as alumina beads or zirconia beads.

During the pulverization operation, the small-diametered active material particles are often oxidized. It is therefore preferred that the pulverized small-diametered active material particles, the average particle size $D_{50}$ of which has been reduced to 0.1 to 10 μm, be subjected to etching with an etching solution to remove the oxide on the surface of the particles. By so doing, the oxygen concentration of the whole small-diametered active material particles and the oxygen concentration of the outermost surface of the particles can easily be controlled to or below the recited values. Useful etching solutions include aqueous solutions of HF, buffered acids, $NH_4F$, KOH, NaOH, ammonia or hydrazine. The degree of etching can be controlled appropriately by the kind and concentration of the etching solution, the temperature of the etching solution, the etching time, and the like. As a result, the oxygen concentration of the whole small-diametered active material particles and the oxygen concentration of the outermost surface of the particles can easily be controlled within the recited ranges. Note that, however, the oxide on the particle surface should not be removed completely in the etching step. This is because particles from which the surface oxide has completely been removed would be oxidized rapidly when they are exposed to the atmosphere. Therefore, the degree of etching is preferably controlled so that an adequate amount of the oxide may remain. Even after being exposed to the atmosphere, those particles having an adequate amount of the oxide remaining on the surface thereof are capable of maintaining almost the same surface and whole oxygen concentrations as adjusted by the etching.

When etching is effected using HF, for example, the small-diametered active material particles are put into an HF solution having a concentration of about 1 to 50% by weight, and the system is stirred at room temperature for about 5 to 30 minutes, whereby the surface oxygen concentration can be reduced to a desired level. When in using KOH or NaOH for etching, the small-diametered active material particles are put into an aqueous solution having a concentration of about 1 to 40% by weight, and the system is stirred at room temperature for about 5 to 120 minutes. In using ammonia, the small-diametered active material particles are put into an aqueous solution having a concentration of about 1 to 20% by weight, and the system is stirred at room temperature for about 5 to 60 minutes to carry out etching. When $NH_4F$ is used, the small-diametered active material particles are put into an aqueous solution having a concentration of about 1 to 50% by weight, followed by stirring at room temperature for about 5 to 60 minutes to conduct etching. In using hydrazine, the small-diametered active material particles are put into an aqueous solution having a concentration of about 1 to 50% by weight, followed by stirring at room temperature for about 5 to 60 minutes to compete etching.

The negative electrode containing the above-described small-diametered active material particles is less susceptible to cracking and pulverizing with repetition of charge/discharge cycles. As a result, charge/discharge efficiency increases, and irreversible capacity reduces thereby to improve the charge/discharge cycle characteristics. Furthermore, reduction in oxygen content in the small-diametered active material particles also brings about reduction of irreversible capacity, increase of charge/discharge efficiency, and improvement in charge/discharge cycle characteristics.

The small-diametered active material particles may be coated with a thin metal coat. The thin metal coat inhibits oxidation of the small-diametered active material particles to effectively prevent an increase in irreversible capacity and a decrease in charge/discharge current efficiency. In addition, the electron conductivity is improved, and the charge/discharge cycle characteristics are further improved.

In order to inhibit oxidation of the small-diametered active material particles more effectively and to allow Li and Si to react with each other more efficiently, the thickness of the thin metal coat is preferably 0.005 to 4 μm, still preferably 0.05 to 0.5 μm. The thickness of the thin metal coat is measured with, for example, ESCA or AES.

The metal making up the thin metal coat is preferably selected from those having low capability of forming lithium. Such metals include Ni, Cu, Co, Fe, Ag, and Au. Ni, Co, Ag, and Au are still preferred from the standpoint of oxidation prevention. These metals can be used either individually or in the form of an alloy composed of two or more thereof.

In the small-diametered active material particle coated with a thin metal coat, the oxygen concentration in the interfacial part between the thin metal coat and the small-diametered active material particle is such that the Si concentration exceeds ½ the oxygen concentration as described with reference to the aforementioned small-diametered active material particles. The "interfacial part" between the thin metal coat and the small-diametered active material particle is considered to be the part where the concentration of the metal making up the thin metal coat becomes the minimum in AES analysis of the metal-coated small-diametered active material particles.

The lower the oxygen concentration of the outermost surface of the thin metal coat, the more desirable for increasing the electrical conductivity of the metal-coated small-diametered active material particles.

The small-diametered active material particles having a thin metal coat are preferably prepared as follows. Active material particles are pulverized to powder of prescribed size in a dry or wet process in accordance with the above-described process for preparing small-diametered active material particles. The oxide present on the surface of the particles is removed by etching. The etched particles are thoroughly rinsed with water and then subjected to electroless plating to form a thin metal film thereon. Prior to the electroless plating, the particles may be subjected to a surface sensitizing treatment and a surface activating treatment in a usual manner. The electroless plating conditions are selected appropriately according to the plating metal. For instance, the plating bath composition shown below is useful for Ni plating. In this case, the bath has a temperature of about 40 to 60° C. and a pH of about 4 to 6, and the plating time is 0.5 to 50 minutes.

| | |
|---|---|
| $NiSO_4 \cdot 6H_2O$ | 15-35 g/l |
| $NaH_2PO_2 \cdot H_2O$ | 10-30 g/l |

-continued

| | |
|---|---|
| Na$_3$C$_6$H$_5$O$_7$ | 15-35 g/l |
| NaC$_3$H$_5$O$_2$ | 5-15 g/l |

The thin metal coat formed on the small-diametered active material particles does not always need to cover the individual particles completely. For example, the thin metal coat covering the whole particle uniformly may have a large number of micropores extending through the thickness thereof. Such micropores allow an electrolyte to pass through and reach the inside of the small-diametered active material particle, so that the electrochemical reactivity essentially possessed by the silicon-containing particle may surely be manifested. The thin metal coat may also be provided in the form of islands on the particle surface.

A preferred process for producing the negative electrode of the present invention will be described. This process starts with preparation of a slurry to be applied to the surface of a current collector. The slurry comprises active material particles, electro-conductive carbon material particles, a binder, and a diluting solvent. The active material particles and the electro-conductive carbon materials have previously been described. The binder that can be used includes polyvinylidene fluoride (PVDF), polyethylene (PE), and ethylene-propylene-diene monomer (EPDM). The diluting solvent includes N-methylpyrrolidone and cyclohexane.

The amount of the active material particles in the slurry is preferably about 14% to 40% by weight. The amount of the electro-conductive carbon material is preferably about 0.4% to 4% by weight. The amount of the binder is preferably about 0.4% to 4% by weight. The amount of the diluting solvent is preferably about 60% to 85% by weight.

The slurry is applied to the surface of a current collector. The current collector may be prepared separately or in the same line for producing the negative electrode of the invention. In the latter case, the current collector is preferably prepared by electrodeposition. The spread of the slurry on the current collector is preferably such that the dry thickness of the active material layer is about one to three times the thickness of a finally obtained active material structure. After the coating of the slurry dries to form an active material layer, the current collector having the active material layer formed thereon is immersed in a plating bath containing an electro-conductive material having low capability of forming a lithium compound and electroplated in this state with the conductive material to form a surface coating layer on the active material layer. By using this process, a surface coating layer with a large number of micropores can easily be formed. In more detail, since the active material layer 3 has a microscopically textured surface as described supra, there are active sites where deposit grows easily and sites where deposit does not grow easily in a mixed state. When the active material layer 3 having such a surface condition is electroplated, the deposit grows non-uniformly, and the particles of the material making up the surface coating layer 4 grow into a polycrystalline structure. On further growth of crystals, adjacent crystals meet, resulting in formation of microvoids in the meeting site. The following is recommended electroplating conditions taking copper, for instance, as an electro-conductive material. In using a copper sulfate-based solution, electroplating is performed at a copper concentration of 30 to 100 g/l, a sulfuric acid concentration of 50 to 200 g/l, a chlorine concentration of 30 ppm or lower, a bath temperature of 30 to 80° C., and a current density of 1 to 100 A/dm$^2$. Under these electrolysis conditions, it is easy to form a surface coating layer part of which enters into the active material layer or penetrates and reaches the current collector or a surface coating layer penetrating throughout the active material layer. In another electrolysis system, a copper pyrophosphate-based solution can be used. In this case, electroplating is conducted at a copper concentration of 2 to 50 g/l, a potassium pyrophosphate concentration of 100 to 700 g/l, a bath temperature of 30 to 60° C., a pH of 8 to 12, and a current density of 1 to 10 A/dm$^2$.

After the surface coating layer is thus formed on the active material layer, the active material layer as covered with the surface coating layer may be subjected to mechanical pressing thereby densify the active material layer. As a result of densification, the voids among the active material particles and the conductive carbon material particles are filled with the conductive material constituting the surface coating layer to make a structure in which the active material particles and the conductive carbon material particles are dispersed. Furthermore, these particles and the surface coating layer come into closer contact to improve electron conductivity. Additionally, the void volume of the active material layer is adjusted appropriately to relax the stress resulting from the active material particles' expansion and contraction due to intercalation and deintercalation of lithium. In order to obtain sufficient electron conductivity, the densification by mechanical pressing is preferably such that the total thickness of the active material layer and the surface coating layer after mechanical pressing may be 90% or less, particularly 80% or less, of that before mechanical pressing. Mechanical pressing can be carried out with, for example, a roll press.

In this process of production, it is possible to mechanically press the active material layer before the electroplating. For the sake of distinguishing from the above-mentioned mechanical pressing, the mechanical pressing before the electroplating will be called prepressing. Prepressing is effective in preventing separation between the active material layer and the current collector and preventing the active material particles from being exposed on the surface coating layer. As a result, deterioration of battery cycle life due to fall-off of the active material particles can be averted. The prepressing conditions are preferably such that the thickness of the active material layer after prepressing is 95% or less, particularly 90% or less, of that before prepressing.

The electroplating used in the process for forming the surface coating layer may be replaced with sputtering, chemical vapor deposition or physical vapor deposition. The surface coating layer may also be formed by rolling an electro-conductive foil, for example, by rolling a metal foil, a metal mesh foil or an electro-conductive plastic film. In using these materials, creation of micropores in the surface coating layer can be achieved by pressing under so controlled conditions.

In another preferred process of producing the negative electrode of the present invention, a dispersion plating technique is employed. To conduct dispersion plating, a plating bath having suspended therein active material particles and containing an electro-conductive material having low capability of forming a lithium compound is prepared. In order to incorporate a sufficient amount of the active material particles into the active material structure, the amount of the active material particles in the plating bath is preferably 200 to 600 g/l, still preferably 400 to 600 g/l. In using copper as an electro-conductive material having low capability of forming a lithium compound and copper sulfate as a copper source, the plating bath preferably has the following formulation in view of plating rate controllability and capability of building up a surface coating layer to a thickness enough to sufficiently hold an active material layer of the active material particles. A preferred copper concentration is 30 to 100 g/l. A preferred sulfuric acid concentration is 50 to 200 g/l. A preferred chlorine concentration is 300 ppm or lower. A preferred cresolsulfonic acid concentration is 40 to 100 g/l. A preferred gelatin concentration is 1 to 3 g/l. A preferred β-naphthol concentration is 0.5 to 2 g/l.

A current collector is immersed in the plating bath, and electroplating is started in this state. The current density used in the electrolysis is preferably about 1 to 15 A/dm$^2$ from the standpoint of plating rate control. The plating bath temperature is room temperature, which is around 20° C. By this electroplating, the metal in the plating bath is reduced to form a surface coating layer and, at the same time, an active material layer covered with the surface coating layer is formed on the surface of the current collector. In order to form the active material layer uniformly, the electrolysis may be effected while stirring the plating bath.

While the current collectors that can be used in the present invention have been described supra, a current collector formed of the following porous metal foil is also preferably used. The porous metal foil (hereinafter simply called a metal foil) has a great number of micropores. It has both micropores piercing therethrough in the thickness direction thereof and micropores that are closed within the thickness thereof The term "micropores" as used herein is intended to indicate those holes which pierce the foil in the thickness direction. This does not mean that a metal foil having micropores that are closed within the thickness of the foil is excluded, nor that such a metal foil is unfavorable.

The above-described metal foil, when used as a current collector of a nonaqueous electrolyte secondary battery, secures sufficient passageways therethrough for an electrolyte thereby bringing about a further increase in battery capacity. Moreover, the active material is more effectively prevented from falling off from the electrode as a result of intercalating and deintercalating lithium.

The micropores of the metal foil preferably have a diameter of 0.01 to 200 μm, still preferably 0.05 to 50 μm, particularly preferably 0.1 to 10 μm. Micropores with a diameter less than 0.01 μm can fail to secure passage of a nonaqueous electrolyte sufficiently. Where the pore diameter exceeds 200 μm, the metal foil strength tends to reduce in relation to the foil thickness described below, the active material tends to fall off with intercalating and deintercalating of lithium, and the resulting nonaqueous electrolyte secondary battery tends to have reduced cycle characteristics. Not all the pores piercing the metal foil are required to have a diameter falling within the recited range. It is acceptable that the metal foil has a very small number of micropores with diameters out of that range that are unavoidably created in the course of metal foil manufacturing.

The number of micropores whose diameter is in the recited range per unit area (pore density) is preferably 5 to 10000/cm$^2$, still preferably 10 to 5000/cm$^2$, particularly preferably 100 to 2000/cm$^2$, in every part of the metal foil. Metal foil with a pore density of less than 1/cm$^2$ can fail to supply a sufficient amount of a nonaqueous electrolyte to the active material. A pore density exceeding 10000/cm$^2$ can reduce the strength of the metal foil in relation to the upper limit of the pore diameter.

The diameter and density of the micropores are measured as follows. A metal foil is photographed with its back side irradiated with light in a dark room, and the photograph is analyzed by image processing to obtain the diameter and density of the micropores.

The metal foil preferably has a thickness of 1 to 100 μm, still preferably 2 to 20 μm, particularly preferably 3 to 10 μm. Metal foil with a thickness less than 1 μm brings about increased energy density but has insufficient mechanical strength and is often difficult to produce. With a thickness greater than 100 μm, formation of piercing micropores is not easy, which makes it difficult to increase the energy density and hinders smooth passage of an electrolyte.

The metal foil can be of various metallic materials. For example, the metal foil contains at least one metal selected from Cu, Ni, Co, Fe, Cr, Sn, Zn, In, Ag, and Au. In other words, the metal foil can be of a single substance selected from these metals, an alloy of two or more metals selected from these elements, or a material containing at least one of these elements and other element(s). A metal foil made of Cu, Ni, Co, Fe, Cr or Au is preferred for its low reactivity with lithium.

A preferred process of preparing a metal foil is described with reference to FIGS. 5(a) through 5(f). First of all, a carrier foil 11 is prepared as shown in FIG. 5(a). The material of the carrier foil 11 is not particularly limited. The carrier foil 11 is preferably electro-conductive. The carrier foil 11 does not need to be made of metal as long as it is electro-conductive. Nevertheless, use of a metal-made foil as the carrier foil 11 is advantageous in that the carrier foil 11, which is left after making metal foil, can be melted and recycled into foil. In using a metal-made carrier foil 11, it is preferred to use a carrier foil 11 containing at least one metal selected from Cu, Ni, Co, Fe, Cr, Sn, Zn, In, Ag, Au, Al, and Ti. Considering that the carrier foil 11 is used as a support for making metal foil, it is desirable for the carrier foil 11 to have sufficient strength not to bunch up in the production of the metal foil. Accordingly, the carrier foil 11 preferably has a thickness of about 10 to 50 μm.

A coat 12 is formed on one side of the carrier foil 11 by a prescribed method as shown in FIG. 5(b). Before formation of the coat, it is preferred that the surface of the carrier foil 11 be cleaned by a pretreatment such as acid cleaning. The coat 12 serves to make the carrier foil surface, on which metal foil is to be formed, non-uniform in electron conductivity thereby to form a large number of micropores in the resulting metal foil. The coat 12 is preferably applied to a thickness of 0.001 to 1 μm, still preferably 0.002 to 0.5 μm, particularly preferably 0.005 to 0.2 μm. Applied to a thickness in that range, the coat 12 covers the surface of the carrier foil 11 discontinuously, for example in the form of islands. Discontinuous formation of the coat 12 is advantageous for forming the micropores with the aforementioned diameter and density more easily. In FIG. 5(b), the size of the coat 12 is exaggerated for the sake of better understanding.

The coat 12 is made of a material different from the material which makes up the metal foil, whereby the resulting metal foil can successfully be peeled from the carrier foil 11 in the step of peeling hereinafter described. It is preferred for the material of the coat 12 to differ from the material which makes up metal foil and to contain at least one element of Cu, Ni, Co, Mn, Fe, Cr, Sn, Zn, In, Ag, Au, C, Al, Si, Ti, and Pd.

The process of forming the coat 12 is not particularly restricted. For example, the process of forming the coat 12 can be selected in relation to the process of forming metal foil described infra. More specifically, where the metal foil is to be formed by electroplating, it is preferred to form the coat 12 also by electroplating from the standpoint of production efficiency and the like. The coat 12 can also be formed by other processes, such as electroless plating, sputtering, physical vapor deposition (PVD), chemical vapor deposition (CVD), a sol-gel process, and ion plating.

Where the coat 12 is formed by electroplating, a proper plating bath and plating conditions are decided according to the constituent material of the coat 12. For example, in making the coat 12 of tin, a plating bath having the composition shown below or a tin borofluoride bath can be used. In using these plating baths, the bath temperature is preferably about 15 to 30° C., and the current density is preferably about 0.5 to 10 A/dm$^2$.

| | |
|---|---|
| SnSO$_4$ | 30 to 70 g/l |
| H$_2$SO$_4$ | 60 to 150 g/l |
| Cresolsulfonic acid | 70 to 100 g/l |

As stated above, the coat 12 is used to provide the surface of the carrier foil 11, on which metal foil is to be formed, with non-uniform electron conductivity. When the constituent material of the coat 12 is largely different from the carrier foil 11 in electron conductivity, application of the coat 12 immediately imparts non-uniformity of electron conductivity to the surface on which metal foil is to be formed. Use of carbon as a material of the coat 12 is an example of that case. On the other hand, when in using, as a constituent material of the coat 12, a material whose electron conductivity is about the same as that of the carrier foil 11, such as various metallic materials including tin, application of the coat 12 does not immediately result in non-uniform electron conductivity of the surface for forming metal foil. Then, in case where the coat 12 is made of such a material, it is preferred that the carrier foil 11 having the coat 12 formed thereon be exposed to an oxygen-containing atmosphere, such as the air, in a dry condition, thereby to oxidize the surface of the coat 12 (and the exposed area of the carrier foil 11) (see FIG. 5(c)). By this operation, the electron conductivity on the surface for forming metal foil becomes non-uniform. When electroplating (described infra) is performed on the surface with the thus created non-uniformity of electron conductivity, there is produced a difference in electrodeposition rate between the surface of the coat 12 and the exposed area of the carrier foil 11. As a result, a metal foil having micropores which have the above-recited diameter at the above-recited density can easily be formed. The degree of oxidation is not critical in the present invention. According to the present inventors' study, it has been confirmed that allowing the carrier foil 11 having the coat 12 formed thereon, for example, in the atmosphere for about 10 to 30 minutes is sufficient. However, the carrier foil 11 having the coat 12 formed thereon may be forcibly oxidized.

The reason why the exposure of the carrier foil 11 having the coat 12 formed thereon to an oxygen-containing atmosphere is carried out in a dry condition, is for the sake of oxidation efficiency. For example, where the coat 12 is formed by electroplating, it is sufficient to take the carrier foil 11 out of the plating bath, to dry the carrier foil 11 by means of a dryer, etc. and to allow it to stand in the atmosphere for a given time. Where the coat 12 is formed by dry processes, such as sputtering and various vacuum deposition techniques, the drying operation is unnecessary and the foil 11 having the coat 12 formed thereon is allowed to stand in the atmosphere as it is.

Oxidizing the coat 12 is followed by applying a release agent 13 thereon as shown in FIG. 5(d). The release agent 13 is used to facilitate peeling the metal foil off the carrier foil in the peeling step which will be hereinafter described. An organic compound is preferably applied as the release agent 13. Nitrogen-containing compounds or sulfur-containing compounds are particularly preferred. The nitrogen-containing compounds preferably include triazole compounds, such as benzotriazole (BTA), carboxybenzotriazole (CBTA), tolyltriazole (TTA), N',N'-bis(benzotriazolylmethyl)urea (BTD-U), and 3-amino-1H-1,2,4-triazole (ATA). The sulfur-containing compounds include mercaptobenzothiazole (MBT), thiocyanuric acid (TCA), and 2-benzimidazolethiol (BIT). Considering that the purpose of applying a release agent is just to facilitate peeling the formed metal foil off the carrier foil 11 in the hereinafter described step of peeling, a porous metal foil can be formed without the step of applying a release agent.

A material for making metal foil is then deposited on the release layer 13 by electroplating to form a metal foil 14 as shown in FIG. 5(e). The resulting metal foil 14 contains a great number of micropores. While FIG. 5(e) shows that the micropores are formed at positions on the top of the individual islands (the coat 12), the aim of this depiction is only for the sake of convenience. In fact, the micropores are not always formed at positions on the top of the individual islands (the coat 12). The plating bath and plating conditions are chosen appropriately according to the material of the metal foil. In making a metal foil 14 of Ni, for instance, a Watts bath having the composition shown below or a sulfamic acid bath can be used as a plating bath. In using these baths, the bath temperature is preferably about 40 to 70° C., and the current density is preferably about 0.5 to 20 A/dm$^2$.

| | |
|---|---|
| NiSO$_4$.6H$_2$O | 150 to 300 g/l |
| NiCl$_2$.6H$_2$O | 30 to 60 g/l |
| H$_3$BO$_3$ | 30 to 40 g/l |

The above-described process of preparing a metal foil 14 is advantageous in that the diameter and the density of micropores can be controlled with ease for the following reason. In the process, a fresh carrier foil is used for every lot of metal foil. That is, a metal foil is always electrodeposited on a fresh surface so that the condition of the surface on which metal foil is formed can be maintained as constant.

Being so thin as previously stated, the resulting metal foil 14 is often difficult to handle by itself. This being the case, it is advisable to leave the metal foil 14 remaining on the carrier foil 11 until prescribed processing operations (such as formation of an active material layer as described later) on the metal foil 14 complete. The metal foil 14 is peeled from the carrier foil 11 as depicted in FIG. 5(f) after completion of the prescribed processing operations. Since the release agent 13 has been applied between the carrier foil 11 and the metal foil 14 as described, peeling of the metal foil 14 from the carrier foil 11 can be achieved very smoothly. Although FIG. 5(f) shows that the coat 12 remains on the side of the carrier foil 11 after peeling, it depends on the circumstances whether the coat 12 actually remains on the carrier foil side or the metal foil side. The same applies to the release agent. On whichever side the coat 12 remains, the coat and the release agent give no adverse influences on the metal foil in view of their very small amounts.

Instead of the above-described process, the metal foil 14 can also be prepared by the following process (hereinafter called an alternative process (1)). In the alternative process (1), a coating, e.g., paste, containing carbonaceous material particles is prepared. Useful carbonaceous materials include acetylene black. In order to easily form micropores with the recited diameter at the recited density, it is preferred for the carbonaceous material to have an average particle size D$_{50}$ (determined by a laser diffraction scattering method combined with scanning electron microscopic observation) of about 2 to 200 nm, particularly about 10 to 100 nm. The coating is applied to a prescribed support. The coating thickness is preferably about 0.001 to 1 µm, still preferably about 0.05 to 0.5 µm. A material of the metal foil is then deposited on the coating layer by electroplating to form metal foil. The conditions of the electroplating can be the same as those used in the above-described process.

The support used here typically includes, but is not limited to, the aforementioned carrier foil.

After the formation of metal foil, the metal foil may be either separated from the support or left on the support as formed. For example, when the process is applied to the manufacture of a negative electrode for a nonaqueous electrolyte secondary battery, there is no need to separate the metal foil. In contrast, where the metal foil is to be separated, it is advisable to apply a release agent on the coating layer formed by applying the carbonaceous material-containing paste and then to electrodeposit the metal foil thereon so as to facilitate peeling. The release agent that can be used includes those usable in the above-described process.

The metal foil can also be obtained by the following process (hereinafter called an alternative process (2)) instead of the alternative process (1). In the alternative process (2), a plating bath containing the material of metal foil is prepared. In making Ni foil, for instance, the aforementioned Watts bath or sulfamic acid bath is prepared. Particles of a carbonaceous material are added and suspended in the plating bath. The kind and the particle size of the carbonaceous material can be chosen from those useful in the alternative process (1). For easy formation of micropores with the recited diameter at the recited density, the amount of the carbonaceous material to be suspended in the plating bath is preferably about 0.5 to 50 g/l, still preferably about 1 to 10 g/l.

A prescribed support is electroplated in the plating bath while stirring the bath to keep the carbonaceous material suspended. The material constituting metal foil is thus electrodeposited to form a metal foil 14. The same support as useful in the alternative process (1) is usable as well. The metal foil thus formed can be handled in the same manner as for the one obtained by the alternative process (1). If desired, the support may have a release agent applied thereto to successfully separate the formed metal foil.

The negative electrode using the porous metal foil 14 is produced as follows. The negative electrode can be produced by taking advantage of the above-described processes of preparing metal foil. For example, metal foil is prepared in accordance with the process shown in FIGS. 5(a) through 5(e). With the metal foil remaining on the carrier foil, an active material layer is formed on the metal foil. The active material layer is formed by applying, for example, paste containing active material particles and electro-conductive material particles. The metal foil having the active material layer formed thereon is immersed in a plating bath containing an electro-conductive material having low capability of forming a lithium compound. In this state, the active material layer is electroplated with the conductive material to form a surface coating layer. Finally, the metal foil is separated from the carrier foil as shown in FIG. 5(f) to obtain a negative electrode.

The thus obtained negative electrode of the invention is assembled together with a known positive electrode, separator, and nonaqueous electrolyte into a nonaqueous electrolyte secondary battery. A positive electrode is obtained as follows.

A positive electrode active material and, if necessary, a conductive material and a binder are suspended in an appropriate solvent to prepare a positive electrode active material mixture, which is applied to a current collector, dried, rolled, and pressed, followed by cutting and punching. The positive electrode active material includes conventionally known ones, such as lithium-nickel composite oxide, lithium-manganese composite oxide, and lithium-cobalt composite oxide. Preferred separators include a nonwoven fabric of synthetic resins and a porous film of polyethylene or polypropylene. The nonaqueous electrolyte used in a lithium secondary battery, for example, is a solution of a lithium salt, which is a supporting electrolyte, in an organic solvent. The lithium salt includes $LiClO_4$, $LiAlCl_4$, $LiPF_6$, $LiAsF_6$, $LiSbF_6$, $LiSCN$, $LiCl$, $LiBr$, $LiI$, $LiCF_3SO_3$, and $LiC_4F_9SO_3$.

The present invention is not limited to the aforementioned embodiments. For example, punching metal or expanded metal having a great number of openings or metal foam, such as nickel foam, can be used as a current collector. In using punching metal or expanded metal, the opening area is preferably 0.0001 to 4 $mm^2$, still preferably 0.002 to 1 $mm^2$. Where punched metal or expanded metal is used, the active material layer is formed preferentially in the openings, and the surface coating layer is formed on the surface of the thus formed active material layer and the surface of the punching metal or expanded metal. On the other hand, where metal foam is used, the cells of the foamed body are filled with the active material layer, and the surface coating layer is formed on the surface of the active material layer and the surface of the metal foam.

While the cross-sectional photographs shown in FIGS. 2 to 4 represent an embodiment in which the active material structure 5 is formed on only one side of the current collector 2, the active material structure may be formed on both sides of the current collector.

The present invention will now be illustrated in greater detail with reference to Examples, but it should be understood that the invention is not construed as being limited thereto. Unless otherwise noted, all the percents are by weight.

Example 1-1

(1) Preparation of Active Material Particles

A molten metal at 1400° C. containing 90% of silicon and 10% of nickel was cast into a copper-made mold and quenched to obtain an ingot of a silicon-nickel alloy. The ingot was pulverized and sieved to obtain silicon-nickel alloy particles having particle sizes of 0.1 to 10 µm. The silicon-nickel alloy particles and nickel particles (particle size: 30 µm) were blended at a rate of 80% 20% and mixed and pulverized simultaneously in an attritor to obtain uniformly mixed particles of silicon-nickel particles and nickel. The mixed particles had the maximum particle size of 1 µm and a $D_{50}$ value of 0.8 µm.

(2) Preparation of Slurry

A slurry having the following composition was prepared.

| | |
|---|---|
| Mixed particles obtained in (1) above | 16% |
| Acetylene black (particle size: 0.1 µm) | 2% |
| Binder (polyvinylidene fluoride) | 2% |
| Diluting solvent (N-methylpyrrolidone) | 80% |

(3) Formation of Active Material Layer

The above prepared slurry was applied to a 35 μm thick copper foil and dried to form an active material layer having a dry thickness of 60 μm. The active material layer was densified by prepressing.

(4) Formation of Surface Coating Layer

The copper foil having the active material layer formed thereon was immersed in a plating bath having the following composition to carry out electroplating.

| | |
|---|---|
| Nickel | 50 g/l |
| Sulfuric acid | 60 g/l |
| Bath temperature | 40° C. |

After formation of the surface coating layer, the copper foil was taken out of the plating bath, and both the active material layer and the surface coating layer were densified by roll pressing. The thickness of the thus formed active material structure was found to be 23 μm as a result of electron microscopic observation. As a result of chemical analysis, the amounts of the active material particles and acetylene black were found to be 40% and 5%, respectively. Presence of micropores in the resulting negative electrode was confirmed by observation under an electron microscope.

Examples 1-2 to 1-4

A negative electrode was produced in the same manner as in Example 1-1, except for using the active material particles shown in Table 1-1 below. The same electron microscopic observation as in Example 1-1 revealed presence of micropores in the resulting negative electrode.

Example 1-5

A 35 μm thick copper foil was plated with nickel to a deposit thickness of 2 μm to prepare a current collector. An active material layer and a surface coating layer were formed on the nickel layer in the same manner as in Example 1-1, except for using the active material particles shown in Table 1-1 in the active material layer. The same electron microscopic observation as in Example 1-1 revealed presence of micropores in the resulting negative electrode.

Examples 1-6

A 400 μm thick nickel foam was used as a current collector. The nickel foam had an average cell diameter of 20 μm. A slurry was prepared in the same manner as in Example 1-1, except for using the active material particles shown in Table 1-1. The nickel foam was impregnated with the slurry. The impregnated foam was immersed in the same plating bath as used in Example 1-1 to carry out electroplating. The same electron microscopic observation revealed presence of micropores in the resulting negative electrode.

Example 1-7

A 40 μm thick expanded copper metal sheet was used as a current collector. The area of the individual openings of the expanded metal was 0.01 $mm^2$. A slurry was prepared in the same manner as in Example 1-1, except for using the active material particles shown in Table 1-1, and the expanded metal was impregnated with the slurry. The impregnated expanded metal was immersed in the same plating bath as used in Example 1-1 to carry out electroplating. The same electron microscopic observation revealed presence of micropores in the resulting negative electrode.

M-306[0051]

Comparative Example 1-1

Graphite powder having a particle size of 10 μm, a binder (PVDF), and a diluting solvent (N-methylpyrrolidone) were kneaded to prepare a slurry. The slurry was applied to a 30 μm thick copper foil, dried, and pressed to obtain a negative electrode. The pressed graphite layer was 20 μm thick.

Comparative Example 1-2

A negative electrode was obtained in the same manner as in Comparative Example 1-1, except for replacing graphite powder with silicon powder having a particle size of 5 μm.

Evaluation of Performance:

A nonaqueous electrolyte secondary battery was assembled using each of the negative electrodes prepared in Examples and Comparative Examples as follows. The battery was evaluated in irreversible capacity, capacity density per unit weight when charged, charge/discharge efficiency in the 10th cycle, and capacity retention in the 50th cycle in accordance with the following methods. The results of evaluation are shown in Table 1-1.

1) Preparation of Nonaqueous Electrolyte Secondary Battery

A metallic lithium as a counter electrode and the negative electrode obtained above as a working electrode were placed to face each other with a separator between them and assembled into a nonaqueous electrolyte secondary battery in a usual manner by using an $LiPF_6$ solution in a mixture of ethylene carbonate and diethyl carbonate (1:1 by volume) as a nonaqueous electrolyte.

2) Irreversible Capacity

An irreversible capacity, represented by equation shown below, indicates the part of the charge capacity that is not discharged and remains in the active material.

Irreversible capacity (%)=(1−first discharge capacity/
first charge capacity)×100

3) Capacity Density

The first discharge capacity (mAh/g).

4) Charge/discharge efficiency in the 10th cycle

Charge/discharge efficiency in 10th cycle (%)=discharge capacity in 10th cycle/charge capacity in 10th cycle×100

5) Capacity retention in the 50th cycle

Capacity retention (50th cycle) (%)=discharge capacity (50th cycle)/maximum discharge capacity×100

TABLE 1-1

| | Active Material Structure | | | | | | | | |
|---|---|---|---|---|---|---|---|---|---|
| | Surface Coating Layer | | Active Material Layer | | | | | Charge/Discharge | |
| | | | | Active Material Particles | | | | | |
| | | | Size | Content in | | | | Efficiency | Capacity |
| | Thickness (μm) | Material | Thickness (μm) | $D_{50}$ (μm) | Structure (wt %) | Material | Irreversible Capacity (%) | Capacity Density (mAh/g) | at 10th cycle (%) | Retention in 50th Cycle (%) |
| Example 1-1 | 3 | Ni | 20 | 0.8 | 40 | [Si90/Ni10 (cast)]80/Ni20 | 4 | 3100 | 99.9 | 98 |
| Example 1-2 | 3 | Ni | 20 | 0.8 | 40 | [Si90/Ni10 (cast)]80/Cu20 | 5 | 3100 | 99.9 | 98 |
| Example 1-3 | 3 | Ni | 20 | 0.8 | 40 | [Si80/Cu20 (cast)]80/Ni20 | 4 | 2800 | 99.9 | 97 |
| Example 1-4 | 3 | Ni | 20 | 0.8 | 40 | [Si80/Cu20 (cast)]80/Cu20 | 5 | 2800 | 99.9 | 96 |
| Example 1-5 | 3 | Ni | 20 | 0.8 | 40 | [Si80/Ni20 (cast)]80/Ni20 | 4 | 2800 | 99.9 | 99 |
| Example 1-6 | 3 | Ni | 20 | 0.8 | 40 | [Si80/Ni20 (cast)]80/Ni20 | 4 | 2800 | 99.9 | 99 |
| Example 1-7 | 3 | Ni | 20 | 0.8 | 40 | [Si80/Ni20 (cast)]80/Ni20 | 4 | 2800 | 99.9 | 99 |
| Compara. Example 1-1 | — | | | 10 | 80 | graphite | 10 | 310 | 99.7 | 100 |
| Compara. Example 1-2 | — | | | 5 | 80 | pure Si | 60 | 2000 | 85.0 | 7 |

As is apparent from the results shown in Table 1-1, the secondary batteries using the negative electrodes of Examples each have a lower irreversible capacity and a higher capacity density and charge/discharge efficiency than those using the negative electrodes of Comparative Examples. They also exhibit high capacity retention. While not shown in the Table, the negative electrodes of Examples 1-1 to 1-7 had a structure as shown in FIG. 2 under observation with an electron microscope.

Example 2-1

(1) Preparation of Slurry

A slurry having the following composition was prepared.

| | |
|---|---|
| Tin particles (particle size $D_{50}$: 2 μm) | 16% |
| Acetylene black (particle size: 0.1 μm) | 2% |
| Binder (polyvinylidene fluoride) | 2% |
| Diluting solvent (N-methylpyrrolidone) | 80% |

(2) Formation of Coating

The above prepared slurry was applied to a 30 μm thick copper foil and dried. The thickness of the dried coating was 60 μm.

(3) Formation of Coating Layer

The copper foil having the coating formed thereon was immersed in a plating bath having the following composition to carry out electroplating.

| | |
|---|---|
| Copper | 50 g/l |
| Sulfuric acid | 60 g/l |
| Bath temperature | 40° C. |

After formation of the coating layer, the copper foil was taken out of the plating bath, and the coating layer, including the coating, was densified by roll pressing. The thickness of the resulting coating layer was found to be 20 μm as a result of electron microscopic observation. As a result of chemical analysis, the amounts of tin particles and acetylene black in the coating layer were found to be 70% and 5%, respectively.

Examples 2-2 and 2-3

A negative electrode was obtained in the same manner as in Example 2-1, except that the coating layer was formed of nickel (Example 2-2) or cobalt (Example 2-3).

Example 2-4

A molten metal containing 60% tin and 40% copper at 1000° C. was injected onto the peripheral surface of a copper roll rotating at a high speed (1000 rpm). The injected molten roll is quenched on the roll into a thin tin-copper alloy strip. The cooling rate was $10^3$ K/sec or higher. The strip was ground and sieved to obtain particles having particle sizes of 0.1 to 10 μm. A negative electrode was obtained in the same manner as in Example 2-1, except for using the resulting alloy particles.

Examples 2-5 and 2-6

A negative electrode was obtained in the same manner as in Example 2-4, except for using tin-copper alloy particles having the composition shown in Table 2-1 below.

Examples 2-7 and 2-8

A negative electrode was obtained in the same manner as in Example 2-4, except for using tin-nickel alloy particles having the composition shown in Table 2-1.

Examples 2-9 and 2-10

A negative electrode was obtained in the same manner as in Example 2-4, except for using tin-copper-nickel alloy particles having the composition shown in Table 2-1.

Examples 2-11 to 2-16

A negative electrode was obtained in the same manner as in Example 2-4, except for using tin-based ternary alloy particles having the composition shown in Table 2-1 prepared by a quenching process.

Example 2-17

Tin particles (particle size: 30 μm) 90% and copper particles (particle size: 30 μm) 10% were mixed and pulverized simultaneously in an attritor to obtain uniformly mixed tin/copper powder having particle sizes of 0.1 to 10 μm ($D_{50}$: 2 μm). A negative electrode was obtained in the same manner as in Example 2-1, except for using the resulting mixed powder.

Examples 2-18 to 2-31

A negative electrode was obtained in the same manner as in Example 2-17, except for using tin-copper mixed powder of the composition and particle size shown in Table 2-2 below or changing the thickness of the coating layer or the content of the mixed powder in the coating layer as shown in Table 2-2.

Examples 2-32 to 2-39

A negative electrode was obtained in the same manner as in Example 2-17, except for using tin-based mixed powder of the composition shown in Table 2-2.

Example 2-40

A molten metal at 1000° C. containing 75% tin and 25% copper was injected onto the peripheral surface of a copper roll rotating at a high speed (1000 rpm). The injected molten roll is quenched on the roll into a thin tin-copper alloy strip. The cooling rate was $10^3$ K/sec or higher. The strip was ground and sieved to obtain particles having particle sizes of 0.1 to 10 μm. The resulting alloy particles 99% and silver particles (particle size: 30 μm) 1% were mixed and pulverized simultaneously in an attritor to obtain uniformly mixed tin-copper alloy/silver powder having particle sizes of 0.1 to 10 μm ($D_{50}$: 2 μm). A negative electrode was obtained in the same manner as in Example 2-1, except for using the resulting mixed powder.

Examples 2-41 to 2-48

A negative electrode was obtained in the same manner as in Example 2-40, except for using mixed powder obtained by mixing the tin-copper alloy particles shown in Table 2-3 below and silver or copper particles in the mixing ratio shown in the Table.

Example 2-49

Tin particles having particle sizes of 0.1 to 10 μm were electroless plated in a plating bath having the tin particles suspended therein and containing copper sulfate and Rochelle salt to obtain copper-coated tin particles. The concentrations of the tin particles, copper sulfate, and Rochelle salt in the plating bath were 500 g/l, 7.5 g/l, and 85 g/l, respectively. The plating bath had a pH of 12.5 and a temperature of 25° C. Formaldehyde was used as a reducing agent and its concentration is 22 cc/l. A negative electrode was obtained in the otherwise same manner as in Example 2-1.

Examples 2-50 to 2-53

A negative electrode was obtained in the same manner as in Example 2-41, except for using copper-coated tin particles (Examples 2-50 and 2-51) or nickel-coated tin particles (Examples 2-52 and 2-53) each having the composition shown in Table 2-3 and obtained by electroless plating.

Comparative Example 2-1

A negative electrode was obtained in the same manner as in Comparative Example 1-1, except for replacing the graphite powder with tin particles having a particle size of 5 μm.

Performance Evaluation:

Nonaqueous electrolyte secondary batteries were assembled using each of the negative electrodes prepared in Examples and Comparative Examples in the same manner as described supra. The battery was evaluated in irreversible capacity, capacity density per unit weight when charged, charge/discharge efficiency in the lath cycle, and capacity retention in the 50th cycle in accordance with the methods described supra. The results of evaluation are shown in Tables 2-1 to 2-3

TABLE 2-1

| Example No. | Coating Layer Thickness (μm) | Coating Layer Plating Material | Particle Size $D_{50}$ (μm) | Content in Coating Layer (wt %) | Negative electrode Active Material Material (Kind of Active Material)*[1] | Irreversible Capacity (%) | Capacity Density (mAh/g) | Charge/Discharge Efficiency at 10th Cycle (%) | Capacity Retention at 50th Cycle (%) |
|---|---|---|---|---|---|---|---|---|---|
| 2-1 | 20 | Cu | 2 | 70 | pure Sn | 9 | 950 | 99.6 | 99 |
| 2-2 | 20 | Ni | 2 | 70 | pure Sn | 14 | 910 | 99.3 | 96 |
| 2-3 | 20 | Co | 2 | 70 | pure Sn | 13 | 900 | 99.1 | 96 |
| 2-4 | 20 | Cu | 2 | 70 | Sn60/Cu40(alloy) | 6 | 450 | 99.9 | 98 |
| 2-5 | 20 | Cu | 2 | 70 | Sn75/Cu25(alloy) | 6 | 650 | 99.9 | 94 |
| 2-6 | 20 | Cu | 2 | 70 | Sn90/Cu10(alloy) | 6 | 850 | 99.9 | 99 |
| 2-7 | 20 | Cu | 2 | 70 | Sn80/Ni20(alloy) | 6 | 500 | 99.9 | 92 |
| 2-8 | 20 | Cu | 2 | 70 | Sn95/Ni15(alloy) | 6 | 850 | 99.9 | 99 |
| 2-9 | 20 | Cu | 2 | 70 | Sn80/Cu10/Ni10 (alloy) | 6 | 750 | 99.9 | 97 |
| 2-10 | 20 | Cu | 2 | 70 | Sn85/Cu10/Ni5 (alloy) | 6 | 800 | 99.9 | 97 |

TABLE 2-1-continued

| | Negative electrode Active Material | | | | | | Charge/ | Capacity |
| | Coating Layer | | | Content in | | Irreversible | Capacity | Discharge | Retention |
| Example No. | Thickness (μm) | Plating Material | Particle Size $D_{50}$ (μm) | Coating Layer (wt %) | Material (Kind of Active Material)*[1] | Capacity (%) | Density (mAh/g) | Efficiency at 10th Cycle (%) | at 50th Cycle (%) |
|---|---|---|---|---|---|---|---|---|---|
| 2-11 | 20 | Cu | 2 | 70 | Sn80/Cu19.5/Al0.5 (alloy) | 8 | 870 | 99.9 | 92 |
| 2-12 | 20 | Cu | 2 | 70 | Sn80/Cu19.5/Ni0.5 (alloy) | 9 | 810 | 99.9 | 96 |
| 2-13 | 20 | Cu | 2 | 70 | Sn80/Cu19.5/Co0.5 (alloy) | 9 | 800 | 99.9 | 98 |
| 2-14 | 20 | Cu | 2 | 70 | Sn80/Cu19.5/Ti0.5 (alloy) | 8 | 820 | 99.9 | 94 |
| 2-15 | 20 | Cu | 2 | 70 | Sn80/Cu19.5/La0.5 (alloy) | 9 | 860 | 99.9 | 97 |
| 2-16 | 20 | Cu | 2 | 70 | Sn80/Cu19.5/Ce0.5 (alloy) | 9 | 860 | 99.9 | 98 |

*[1]Figures indicate % by weight.

TABLE 2-2

| | Negative electrode Active Material | | | | | | Charge/ | |
| | Coating Layer | | | Content in | | Irreversible | Capacity | Discharge | Capacity |
| Example No. | Thickness (μm) | Plating Material | Particle Size $D_{50}$ (μm) | Coating Layer (wt %) | Material (Kind of Active Material)*[1] | Capacity (%) | Density (mAh/g) | Efficiency at 10th Cycle (%) | Retention at 50th Cycle (%) |
|---|---|---|---|---|---|---|---|---|---|
| 2-17 | 20 | Cu | 2 | 70 | Sn90 + Cu10 (mixed powder) | 7 | 880 | 99.9 | 97 |
| 2-18 | 20 | Cu | 0.5 | 70 | Sn90 + Cu10 (mixed powder) | 8 | 880 | 99.9 | 97 |
| 2-19 | 20 | Cu | 10 | 70 | Sn90 + Cu10 (mixed powder) | 7 | 880 | 99.9 | 92 |
| 2-20 | 20 | Cu | 0.2 | 70 | Sn90 + Cu10 (mixed powder) | 7 | 880 | 99.10 | 93 |
| 2-21 | 20 | Cu | 1 | 70 | Sn90 + Cu10 (mixed powder) | 7 | 880 | 99.11 | 97 |
| 2-22 | 20 | Cu | 5 | 70 | Sn90 + Cu10 (mixed powder) | 7 | 880 | 99.12 | 95 |
| 2-23 | 20 | Cu | 20 | 70 | Sn90 + Cu10 (mixed powder) | 7 | 880 | 99.13 | 98 |
| 2-24 | 20 | Cu | 2 | 30 | Sn90 + Cu10 (mixed powder) | 7 | 880 | 99.9 | 94 |
| 2-25 | 20 | Cu | 2 | 50 | Sn90 + Cu10 (mixed powder) | 7 | 880 | 99.9 | 99 |
| 2-26 | 5 | Cu | 1 | 70 | Sn90 + Cu10 (mixed powder) | 8 | 880 | 99.9 | 99 |
| 2-27 | 10 | Cu | 2 | 70 | Sn90 + Cu10 (mixed powder) | 7 | 880 | 99.9 | 96 |
| 2-28 | 15 | Cu | 2 | 70 | Sn90 + Cu10 (mixed powder) | 7 | 880 | 99.9 | 97 |
| 2-29 | 20 | Cu | 2 | 70 | Sn60 + Cu40 (mixed powder) | 8 | 590 | 99.9 | 98 |
| 2-30 | 20 | Cu | 2 | 70 | Sn75 + Cu25 (mixed powder) | 8 | 740 | 99.9 | 98 |
| 2-31 | 20 | Cu | 2 | 70 | Sn95 + Cu5 (mixed powder) | 8 | 890 | 99.9 | 92 |
| 2-32 | 20 | Cu | 2 | 70 | Sn99 + Ag1 (mixed powder) | 5 | 900 | 99.9 | 93 |
| 2-33 | 20 | Cu | 2 | 70 | Sn95 + Ag5 (mixed powder) | 5 | 890 | 99.9 | 96 |
| 2-34 | 20 | Cu | 2 | 70 | Sn90 + Ag10 (mixed powder) | 5 | 870 | 99.9 | 94 |
| 2-35 | 20 | Cu | 2 | 70 | Sn80 + Ag20 (mixed powder) | 5 | 850 | 99.9 | 92 |
| 2-36 | 20 | Cu | 2 | 60 | Sn90 + Si10 (mixed powder) | 7 | 980 | 99.9 | 92 |
| 2-37 | 20 | Cu | 2 | 60 | Sn50 + Si50 (mixed powder) | 7 | 2500 | 99.9 | 93 |
| 2-38 | 20 | Cu | 2 | 60 | Sn50 + Si40 + Cu10 (mixed powder) | 7 | 2200 | 99.9 | 96 |
| 2-39 | 20 | Cu | 2 | 60 | Sn50 + Si40 + Cu10 (mixed powder) | 7 | 2200 | 99.9 | 97 |

*[1]Figures indicate % by weight.

TABLE 2-3

| Example No. | Coating Layer Thickness (μm) | Coating Layer Plating Material | Negative electrode Active Material Particle Size $D_{50}$ (μm) | Content in Coating Layer (wt %) | Material (Kind of Active Material)*[1] | Irreversible Capacity (%) | Capacity Density (mAh/g) | Charge/ Discharge Efficiency at 10th Cycle (%) | Capacity Retention at 50th Cycle (%) |
|---|---|---|---|---|---|---|---|---|---|
| 2-40 | 20 | Cu | 2 | 70 | [Sn75/Cu25]99 + Ag1 (mixed powder) | 5 | 690 | 99.9 | 94 |
| 2-41 | 20 | Cu | 2 | 70 | [Sn75/Cu25]95 + Ag5 (mixed powder) | 5 | 680 | 99.9 | 98 |
| 2-42 | 20 | Cu | 2 | 70 | [Sn75/Cu25]90 + Ag10 (mixed powder) | 5 | 670 | 99.9 | 99 |
| 2-43 | 20 | Cu | 2 | 70 | [Sn75/Cu25]80 + Ag20 (mixed powder) | 5 | 640 | 99.9 | 99 |
| 2-44 | 20 | Cu | 2 | 70 | [Sn75/Cu25]99 + Cu1 (mixed powder) | 5 | 680 | 99.9 | 93 |
| 2-45 | 20 | Cu | 2 | 70 | [Sn75/Cu25]95 + Cu5 (mixed powder) | 5 | 670 | 99.9 | 96 |
| 2-46 | 20 | Cu | 2 | 70 | [Sn75/Cu25]90 + Cu10 (mixed powder) | 5 | 620 | 99.9 | 97 |
| 2-47 | 20 | Cu | 2 | 70 | [Sn75/Cu25]80 + Cu20 (mixed powder) | 5 | 600 | 99.9 | 93 |
| 2-48 | 20 | Cu | 2 | 70 | [Sn75/Cu25]60 + Cu40 (mixed powder) | 5 | 450 | 99.9 | 94 |
| 2-49 | 20 | Cu | 2 | 70 | Sn80/Cu20 (electroless plating) | 5 | 790 | 99.9 | 99 |
| 2-50 | 20 | Cu | 2 | 70 | Sn95/Cu5 (electroless Plating) | 5 | 910 | 99.9 | 98 |
| 2-51 | 20 | Cu | 2 | 70 | Sn99/Cu1 (electroless Plating) | 6 | 930 | 99.9 | 96 |
| 2-52 | 20 | Cu | 2 | 70 | Sn99/Ni1 (electroless plating) | 11 | 900 | 99.9 | 96 |
| 2-53 | 20 | Cu | 2 | 70 | Sn99.5/Ni0.5 (electroless plating) | 7 | 930 | 99.9 | 95 |
| Comp. Ex. 2-1 | no plating | | 5 | 80 | pure Sn | 20 | 950 | 95.0 | 7 |

*[1]Figures indicate % by weight.

As is apparent from the results shown in Tables 2-1 to 2-3, the secondary batteries using the negative electrodes obtained in Examples retain the same levels of irreversible capacity, charge/discharge efficiency and capacity density as the comparative secondary battery using the comparative negative electrode and also have extremely higher capacity retention than the comparative battery.

Example 3-1

(1) Preparation of Plating Bath

| | |
|---|---|
| Silicon particles (particle size $D_{50}$: 5 μm) | 600 g/l |
| Copper sulfate | 50 g/l |
| Sulfuric acid | 70 g/l |
| Cresolsulfonic acid | 70 g/l |
| Gelatin | 2 g/l |
| β-Naphthol | 1.5 g/l |

(2) Dispersion Plating

A 30 μm thick copper foil was immersed in the plating bath, in which the silicon particles were suspended, at 20° C. and electroplated at a current density of 10 A/dm². There was thus formed an active material layer having silicon particles uniformly dispersed therein and a surface coating layer covering the active material layer. As a result of electron microscopic observation, the active material structure containing the active material layer and the surface coating layer was found to be 35 μm. Chemical analysis revealed that the silicon powder content in the active material structure was 30%.

Example 3-2

(1) Preparation of Slurry

A slurry having the following composition was prepared.

| | |
|---|---|
| Silicon particles ($D_{50}$: 5 μm) | 16% |
| Acetylene black (particle size: 0.1 μm) | 2% |
| Binder (polyvinylidene fluoride) | 2% |
| Diluting solvent (N-methylpyrrolidone) | 80% |

(2) Formation of Active Material Layer

The above prepared slurry was applied to a 30 μm thick copper foil and dried to form an active material layer having a dry thickness of 60 μm.

(3) Formation of Surface Coating Layer

The copper foil having the active material layer formed thereon was immersed in a plating bath having the following composition to carry out electroplating.

| | |
|---|---|
| Copper | 50 g/l |
| Sulfuric acid | 60 g/l |
| Bath temperature | 40° C. |

After forming the surface coating layer, the copper foil was taken out of the plating bath, and both the active material layer and the surface coating layer were densified by roll pressing. The thickness of the thus formed active material structure was found to be 30 μm as a result of electron microscopic observation. As a result of chemical analysis, the amounts of the silicon particles and acetylene black in the active material structure were found to be 35% and 5%, respectively.

Examples 3-3 and 3-4

A negative electrode was obtained in the same manner as in Example 3-2, except for forming the coating layer of nickel (Example 3-3) or cobalt (Example 3-4).

Example 3-5

A molten metal at 1400° C. containing 50% of silicon and 50% of copper was cast into a copper-made mold and quenched to obtain an ingot of a silicon-copper alloy. The ingot was pulverized and sieved to obtain alloy particles having particle sizes of 0.1 to 10 μm. A negative electrode was obtained in the same manner as in Example 3-2, except for using the resulting alloy particles.

Examples 3-6 to 3-8

A negative electrode was obtained in the same manner as in Example 3-5, except for using silicon-copper alloy particles of the composition shown in Table 3-1 below.

Examples 3-9 to 3-11

A negative electrode was obtained in the same manner as in Example 3-5, except for using silicon-nickel alloy particles of the composition shown in Table 3-1.

Examples 3-12 and 3-13

A negative electrode was obtained in the same manner as in Example 3-5, except for using silicon-copper-nickel alloy particles of the composition shown in Table 3-1.

Examples 3-14

Silicon particles (particle size: 100 μm) 80% and copper particles (particle size: 30 μm) 20% were mixed and pulverized simultaneously in an attritor to obtain uniformly mixed silicon/copper powder having particle sizes of 2 to 10 μm ($D_{50}$: 5 μm). A negative electrode was obtained in the same manner as in Example 3-2, except for using the resulting mixed powder.

Examples 3-15 to 3-26

A negative electrode was obtained in the same manner as in Example 3-14, except for using silicon-copper mixed powder of the composition and particle size shown in Table 3-2 below and changing the thickness of the active material structure as shown in the Table.

Example 3-27

Silicon particles having particle sizes of 0.2 to 8 μm were electroless plated with copper in a plating bath containing copper sulfate and Rochelle salt, in which the silicon particles were suspended, to obtain copper-coated silicon particles. The concentrations of the silicon particles, copper sulfate, and Rochelle salt in the plating bath were 500 g/l, 7.5 g/l, and 85 g/l, respectively. The plating bath had a pH of 12.5 and a temperature of 25° C. As a reducing agent formaldehyde was used in a concentration of 22 cc/l. A negative electrode was obtained in the otherwise same manner as in Example 3-2.

Examples 3-28 to 3-31

A negative electrode was obtained in the same manner as in Example 3-18, except for using copper-coated silicon particles (Examples 3-28 and 3-29) or nickel-coated silicon particles (Examples 3-30 and 3-31) each having the composition shown in Table 3-2 and obtained by electroless plating.

Examples 3-32 to 3-37

A negative electrode was obtained in the same manner as in Example 3-5, except for using silicon-based ternary alloy particles having the composition shown in Table 3-3 below and prepared by a quenching process.

Example 3-38

Silicon particles (particle size: 100 μm) 20% and graphite particles ($D_{50}$: 20 μm) 80% were mixed and pulverized simultaneously by mechanical milling to obtain uniformly mixed silicon/graphite powder having a particle size ($D_{50}$) of 0.5 μm. A negative electrode was obtained in the same manner as in Example 3-2, except for using the resulting mixed powder and forming the surface coating layer of nickel.

Examples 3-39 to 3-42

A negative electrode was obtained in the same manner as in Example 3-38, except for using mixed powder of the composition shown in Table 3-3.

Example 3-43

A negative electrode was obtained in the same manner as in Example 3-5, except for using alloy powder composed of silicon 80%, copper 19%, and lithium 1% and forming the surface coating layer of nickel.

Evaluation of Performance:

A nonaqueous electrolyte secondary battery was assembled using the negative electrodes prepared in Examples in the same manner as described supra. The battery was evaluated in irreversible capacity, capacity density per unit weight when charged, charge/discharge efficiency in the 10th cycle, and capacity retention in the 50th cycle in accordance with the methods described supra. The results of evaluation are shown in Tables 3-1 through 3-3.

TABLE 3-1

| | Active Material Structure | | | | | | | Charge/ | | |
|---|---|---|---|---|---|---|---|---|---|---|
| | Surface Coating Layer | | | Si-based Active Material Layer | | | | | Discharge | Capacity |
| | | | | | Size | Content in | | Irreversible | Capacity | Efficiency at | Retention in |
| Example No. | Thickness (μm) | Thickness (μm) | Material | Thickness (μm) | D₅₀ (μm) | Structure (wt %) | Material | Capacity (%) | Density (mAh/g) | 10th Cycle (%) | 50th Cycle (%) |
| 3-1 | 30 | 5 | Cu | 25 | 5 | 30 | pure Si | 12 | 4010 | 99.6 | 95 |
| 3-2 | 30 | 5 | Cu | 25 | 5 | 35 | pure Si | 9 | 4010 | 99.7 | 95 |
| 3-3 | 30 | 5 | Ni | 25 | 5 | 35 | pure Si | 14 | 3700 | 99.5 | 96 |
| 3-4 | 30 | 5 | Co | 25 | 5 | 35 | pure Si | 13 | 3600 | 99.5 | 96 |
| 3-5 | 30 | 5 | Cu | 25 | 5 | 45 | Si50/Cu50 | 5 | 2000 | 99.7 | 99 |
| 3-6 | 30 | 5 | Cu | 25 | 5 | 40 | Si60/Cu40 | 6 | 2400 | 99.7 | 99 |
| 3-7 | 30 | 5 | Cu | 25 | 5 | 40 | Si70/Cu30 | 6 | 2800 | 99.7 | 99 |
| 3-8 | 30 | 5 | Cu | 25 | 5 | 38 | Si80/Cu20 | 6 | 3200 | 99.7 | 99 |
| 3-9 | 30 | 5 | Cu | 25 | 5 | 45 | Si50/Ni50 | 6 | 500 | 99.7 | 99 |
| 3-10 | 30 | 5 | Cu | 25 | 5 | 40 | Si65/Ni35 | 6 | 800 | 99.7 | 99 |
| 3-11 | 30 | 5 | Cu | 25 | 5 | 35 | Si80/Ni20 | 6 | 1300 | 99.7 | 99 |
| 3-12 | 30 | 5 | Cu | 25 | 5 | 40 | Si60/Cu20/Ni20 | 6 | 2000 | 99.7 | 99 |
| 3-13 | 30 | 5 | Cu | 25 | 5 | 40 | Si70/Cu15/Ni15 | 6 | 2300 | 99.7 | 99 |

TABLE 3-2

| | Active Material Structure | | | | | | | Charge/ | | |
|---|---|---|---|---|---|---|---|---|---|---|
| | Surface Coating Layer | | | Si-based Active Material Layer | | | | | Discharge | Capacity |
| | | | | | | Content in | | Irreversible | Capacity | Efficiency at | Retention |
| Example No. | Thickness (μm) | Thickness (μm) | Material | Thickness (μm) | Size D₅₀ (μm) | Structure (wt %) | Material | Capacity (%) | Density (mAh/g) | 10th Cycle (%) | in 50th Cycle (%) |
| 3-14 | 30 | 5 | Cu | 25 | 5 | 38 | Si80/Cu20 | 7 | 3200 | 99.7 | 99 |
| 3-15 | 30 | 5 | Cu | 25 | 0.8 | 38 | Si80/Cu20 | 8 | 3200 | 99.9 | 100 |
| 3-16 | 30 | 5 | Cu | 25 | 10 | 38 | Si80/Cu20 | 7 | 3200 | 99.7 | 96 |
| 3-17 | 30 | 5 | Cu | 25 | 20 | 38 | Si80/Cu20 | 7 | 3200 | 99.6 | 95 |
| 3-18 | 30 | 5 | Cu | 25 | 5 | 10 | Si80/Cu20 | 7 | 3200 | 99.8 | 99 |
| 3-19 | 30 | 5 | Cu | 25 | 5 | 20 | Si80/Cu20 | 7 | 3200 | 99.7 | 99 |
| 3-20 | 5 | 1 | Cu | 4 | 1 | 38 | Si80/Cu20 | 8 | 3200 | 99.8 | 99 |
| 3-21 | 10 | 2 | Cu | 8 | 5 | 38 | Si80/Cu20 | 7 | 3200 | 99.7 | 99 |
| 3-22 | 15 | 3 | Cu | 12 | 5 | 38 | Si80/Cu20 | 7 | 3200 | 99.7 | 99 |
| 3-23 | 20 | 4 | Cu | 16 | 5 | 38 | Si80/Cu20 | 7 | 3200 | 99.7 | 99 |
| 3-24 | 30 | 5 | Cu | 25 | 5 | 37 | Si90/Cu10 | 8 | 3600 | 99.7 | 98 |
| 3-25 | 30 | 5 | Cu | 25 | 5 | 36 | Si95/Cu5 | 8 | 3600 | 99.7 | 98 |
| 3-26 | 30 | 5 | Cu | 25 | 5 | 36 | Si95/Ni5 | 9 | 3500 | 99.7 | 98 |
| 3-27 | 30 | 5 | Cu | 25 | 5 | 35 | Si80/Cu20 | 5 | 3200 | 99.7 | 99 |
| 3-28 | 30 | 5 | Cu | 25 | 5 | 35 | Si80/Cu20 | 5 | 3800 | 99.7 | 99 |
| 3-29 | 30 | 5 | Cu | 25 | 5 | 35 | Si99/Cu1 | 6 | 3900 | 99.7 | 99 |
| 3-30 | 30 | 5 | Cu | 25 | 5 | 35 | Si99/Ni1 | 11 | 3900 | 99.7 | 99 |
| 3-31 | 30 | 5 | Cu | 25 | 5 | 35 | Si99.5/Ni0.5 | 7 | 4000 | 99.7 | 99 |

TABLE 3-3

| | Active Material Structure | | | | | | | Charge/ | | |
|---|---|---|---|---|---|---|---|---|---|---|
| | Surface Coating Layer | | | Si-based Active Material Layer | | | | | Discharge | Capacity |
| | | | | | Size | Content in | | Irreversible | Capacity | Efficiency at | Retention |
| Example No. | Thickness (μm) | Thickness (μm) | Material | Thickness (μm) | D₅₀ (μm) | Structure (wt %) | Material | Capacity (%) | Density (mAh/g) | 10th Cycle (%) | in 50th Cycle (%) |
| 3-32 | 30 | 5 | Cu | 25 | 5 | 38 | Si80/Cu19.5/Al0.5 | 8 | 3100 | 99.7 | 99 |
| 3-33 | 30 | 5 | Cu | 25 | 5 | 38 | Si80/Cu19.5/Ni0.5 | 9 | 3100 | 99.7 | 99 |
| 3-34 | 30 | 5 | Cu | 25 | 5 | 38 | Si80/Cu19.5/Co0.5 | 9 | 3000 | 99.7 | 99 |
| 3-35 | 30 | 5 | Cu | 25 | 5 | 38 | Si80/Cu19.5/Ti0.5 | 8 | 3100 | 99.7 | 99 |
| 3-36 | 30 | 5 | Cu | 25 | 5 | 38 | Si80/Cu19.5/La0.5 | 9 | 3060 | 99.7 | 99 |
| 3-37 | 30 | 5 | Cu | 25 | 5 | 38 | Si80/Cu19.5/Ce0.5 | 9 | 3070 | 99.7 | 99 |
| 3-38 | 30 | 5 | Ni | 25 | 0.5 | 35 | Si20/C80 | 6 | 1040 | 99.8 | 100 |
| 3-39 | 30 | 5 | Ni | 25 | 0.5 | 35 | Si40/C60 | 6 | 1740 | 99.8 | 97 |
| 3-40 | 30 | 5 | Ni | 25 | 0.5 | 35 | Si40/C40/Cu20 | 6 | 1600 | 99.8 | 97 |
| 3-41 | 30 | 5 | Ni | 25 | 0.5 | 35 | Si60/C40 | 7 | 2510 | 99.7 | 94 |

TABLE 3-3-continued

| | Active Material Structure | | | | | | | | Charge/ | |
| | Surface Coating Layer | | | Si-based Active Material Layer | | | | | Discharge | Capacity |
| | | | | Size | Content in | | Irreversible | Capacity | Efficiency at | Retention |
| Example No. | Thickness (μm) | Thickness (μm) | Material | Thickness (μm) | $D_{50}$ (μm) | Structure (wt %) | Material | Capacity (%) | Density (mAh/g) | 10th Cycle (%) | in 50th Cycle (%) |
|---|---|---|---|---|---|---|---|---|---|---|---|
| 3-42 | 30 | 5 | Ni | 25 | 0.5 | 35 | Si80/C20 | 8 | 3230 | 99.7 | 92 |
| 3-43 | 30 | 5 | Ni | 25 | 5 | 38 | Si80/Cu19/Li1 | 0 | 3200 | 100 | 100 |

As is apparent from the results shown in Tables 3-1 to 3-3, the secondary batteries using the negative electrodes obtained in Examples can exhibit extremely high irreversible capacity, charge/discharge efficiency, capacity retention and capacity density.

INDUSTRIAL APPLICABILITY

The negative electrode for nonaqueous secondary batteries according to the present invention provides a secondary battery having higher energy density than conventional negative electrodes. The negative electrode for nonaqueous secondary batteries according to the present invention prevents the active material from falling off the current collector so that the current collecting performance of the active material is maintained against repetition of charge/discharge cycles. Furthermore, the secondary battery using the negative electrode is less susceptible to deterioration against repetition of charge/discharge cycles and therefore enjoys a greatly extended service life and an increased charge/discharge efficiency.

The invention claimed is:

1. A negative electrode for a nonaqueous electrolyte secondary battery, comprising:
a current collector;
an active material layer on the current collector, the active material layer containing an electro conductive material having a first capability of forming a lithium compound on one side of the current collector, the active material layer containing 5 to 80% by weight of active material particles containing a material having a second capability of forming a lithium compound that is greater than the first capability; and
a surface coating layer located on and completely covering the active material layer, so that falling off as a result of pulverization due to intercalation and deintercalation of lithium is prevented, and the surface coating layer has a polycrystalline structure with a large number of micropores extending in a thickness direction normal to a plane of the surface coating layer and allowing a nonaqueous electrolyte to pass therethrough.

2. The negative electrode for a nonaqueous electrolyte secondary battery according to claim 1, wherein the material having the second capability of forming a lithium compound is tin or silicon.

3. The negative electrode for a nonaqueous electrolyte secondary battery according to claim 1, wherein the active material layer contains 0.1 to 20% by weight of an electroconductive carbon material in addition to said active material particles.

4. The negative electrode for a nonaqueous electrolyte secondary battery according to claim 1, wherein the material constituting the surface coating layer enters the active material layer or reaches the current collector.

5. The negative electrode for a nonaqueous electrolyte secondary battery according to claim 1, wherein the material constituting the surface coating layer penetrates throughout the active material layer.

6. The negative electrode for a nonaqueous electrolyte secondary battery according to claim 2, wherein the active material particles are particles of single silicon or single tin.

7. The negative electrode for a nonaqueous electrolyte secondary battery according to claim 2, wherein the active material particles are mixed particles comprising at least silicon or tin and carbon, the mixed particles containing 10 to 90% by weight of silicon or tin and 10 to 90% by weight of carbon.

8. The negative electrode for a nonaqueous electrolyte secondary battery according to claim 3, wherein the active material particles are mixed particles comprising silicon or tin and a metal, the mixed particles containing 30% to 99.9% by weight of silicon or tin and 0.1 to 70% by weight of at least one element selected from the group consisting of Cu, Ag, Li, Ni, Co, Fe, Cr, Zn, B, Al, Ge, Sn (except for a case where the active material particles contain tin), Si (except for a case where the active material particles contain silicon), In, V, Ti, Y, Zr, Nb, Ta, W, La, Ce, Pr, Pd, and Nd.

9. The negative electrode for a nonaqueous electrolyte secondary battery according to claim 2, wherein the active material particles are silicon compound particles or tin compound particles, the silicon compound particles or the tin compound particles containing 30% to 99.9% by weight of silicon or tin and 0.1 to 70% by weight of at least one element selected from the group consisting of Cu, Ag, Li, Ni, Co, Fe, Cr, Zn, B, Al, Ge, Sn (except for a case where the active material particles contain tin), Si (except for a case where the active material particles contain silicon), In, V, Ti, Y, Zr, Nb, Ta, W, La, Ce, Pr, Pd, and Nd.

10. The negative electrode for a nonaqueous electrolyte secondary battery according to claim 2, wherein the active material particles are mixed particles comprising silicon compound particles or tin compound particles and metal particles,
the mixed particles containing 30% to 99.9% by weight of silicon compound particles or tin compound particles and 0.1 to 70% by weight of particles of at least one element selected from the group consisting of Cu, Ag, Li, Ni, Co, Fe, Cr, Zn, B, Al, Ge, Sn (except for a case where the active material particles contain tin), Si (except for a case where the active material particles contain silicon), In, V, Ti, Y, Zr, Nb, Ta, W, La, Ce, Pr, Pd, and Nd, and
the compound particles containing 30% to 99.9% by weight of silicon or tin and 0.1 to 70% by weight of at least one element selected from the group consisting of Cu, Ag, Li, Ni, Co, Fe, Cr, Zn, B, Al, Ge, Sn (except for a case where the active material particles contain tin), Si (except for a case where the active material particles contain silicon), In, V, Ti, Y, Zr, Nb, Ta, W, La, Ce, Pr, Pd, and Nd.

11. The negative electrode for a nonaqueous electrolyte secondary battery according to claim 2, wherein the active material particles are single silicon or single tin particles coated with a metal, the metal being at least one element selected from the group consisting of Cu, Ag, Ni, Co, Fe, Cr, Zn, B, Al, Ge, Sn (except for a case where the active material particles contain tin), Si (except for a case where the active material particles contain silicon), In, V, Ti, Y, Zr, Nb, Ta, W, La, Ce, Pr, Pd, and Nd, and the active material particles containing 70% to 99.9% by weight of silicon or tin and 0.1 to 30% by weight of the metal.

12. The negative electrode for a nonaqueous electrolyte secondary battery according to claim 1, wherein the active material particles have a maximum particle size of 50 μm or smaller and no larger than 50 μm.

13. The negative electrode for a nonaqueous secondary battery according to claim 1, wherein the active material particles contain silicon and have an average particle size of 0.1 to 10 μm in terms of $D_{50}$ and an oxygen concentration of less than 2.5% by weight, an outermost surface of the active material particles having a silicon concentration of higher than half of an oxygen concentration of the outermost surface.

14. The negative electrode for a nonaqueous electrolyte secondary battery according to claim 1, wherein the surface coating layer contains at least one element selected from the group consisting of Cu, Ag, Ni, Co, Cr, Fe, and In.

15. The negative electrode for a nonaqueous electrolyte secondary battery according to claim 1, wherein the surface coating layer is formed by electroplating.

16. The negative electrode for a nonaqueous electrolyte secondary battery according to claim 1, wherein the surface coating layer is formed by sputtering, chemical vapor deposition or physical vapor deposition.

17. The negative electrode for a nonaqueous electrolyte secondary battery according to claim 1, wherein the surface coating layer is formed by rolling an electro-conductive foil.

18. The negative electrode for a nonaqueous electrolyte secondary battery according to claim 17, wherein the electro-conductive foil is a metal foil or an electro-conductive plastic foil.

19. The negative electrode for a nonaqueous electrolyte secondary battery according to claim 1, wherein the active material layer is formed by applying a slurry containing the active material particles to a surface of the current collector.

20. The negative electrode for a nonaqueous electrolyte secondary battery according to claim 1, wherein the surface coating layer has a thickness of 0.3 to 50 μm, and the active material layer has a thickness of 1 to 100 μm.

21. The negative electrode for a nonaqueous electrolyte secondary battery according to claim 1, wherein the surface coating layer has a thickness of 0.3 to 50 μm, and the active material structure has a thickness of 2 to 100 μm.

22. The negative electrode for a nonaqueous electrolyte secondary battery according to claim 1, wherein the surface coating layer has a thickness of 0.3 to 50 μm, and the electrode has a total thickness of 2 to 200 μm.

23. The negative electrode for a nonaqueous electrolyte secondary battery according to claim 1, wherein the current collector has a large number of micropores of 0.01 to 200 μm in diameter at a density of 5 to 10000 pores per cm2 and has a thickness of 1 to 100 μm.

24. The negative electrode for a nonaqueous electrolyte secondary battery according to claim 1, wherein the current collector is formed of punching metal or expanded metal, each having a large number of openings each having an opening area of 0.0001 to 4 mm² or is formed of metal foam.

25. The negative electrode for a nonaqueous electrolyte secondary battery according to claim 1, wherein the current collector is formed of electrolytic metal foil.

26. The negative electrode for a nonaqueous electrolyte secondary battery according to claim 1, wherein voids are present in the active material layer.

27. A process of producing the negative electrode for a nonaqueous electrolyte secondary battery of claim 3, which comprises applying a slurry comprising the active material particles, the electro-conductive carbon material, a binder, and a diluting solvent to a surface of the current collector, drying the coating to form the active material layer, and electroplating the active material layer with the electro-conductive material having low capability of forming a lithium compound to form the surface coating layer.

28. A process of producing the negative electrode for a electrolyte nonaqueous secondary battery of claim 3, which comprises applying a slurry comprising the active material particles, the electro-conductive carbon material, a binder, and a diluting solvent to a surface of the current collector, drying the coating to form the active material layer, and depositing the electro-conductive material having low capability of forming a lithium compound on the active material layer by sputtering, chemical vapor deposition or physical vapor deposition to form the surface coating layer.

29. A process of producing the negative electrode for a nonaqueous electrolyte secondary battery of claim 23, which comprises forming a coat of a material different from the material making up the current collector on a carrier foil to a thickness of 0.001 to 1 μm, electroplating the carrier foil having the coat with the material making up the current collector to form the current collector, applying a slurry comprising the active material particles, the electro-conductive carbon material, a binder, and a diluting solvent to a surface of the current collector, drying the coating to form the active material layer, electroplating the active material layer with the electro conductive material having low capability of forming a lithium compound to form the surface coating layer, and separating the current collector from the carrier foil.

30. A nonaqueous secondary battery having the negative electrode for a nonaqueous electrolyte secondary battery according to claim 1.

31. A negative electrode for a nonaqueous electrolyte secondary battery, comprising:
  a current collector;
  an active material layer on the current collector, the active material layer containing an electro-conductive material having a first capability of forming a lithium compound, the active material layer containing 5 to 80% by weight of active material particles containing a material having a second capability of forming a lithium compound that is greater than the first capability; and
  a surface coating layer located on and completely covering the active material layer, so that falling off as a result of pulverization due to intercalation and deintercalation of lithium is prevented, and the surface coating layer has a polycrystalline structure with a large number of micropores extending in a thickness direction normal to a plane of the surface coating layer and allowing a nonaqueous electrolyte to pass therethrough.

32. The negative electrode for a nonaqueous electrolyte secondary battery according to claim 31, wherein voids are present in the active material layer.

* * * * *